United States Patent
Maya et al.

(10) Patent No.: US 7,593,998 B2
(45) Date of Patent: Sep. 22, 2009

(54) FILE CACHE-CONTROLLABLE COMPUTER SYSTEM

(75) Inventors: Yuzuru Maya, Sagamihara (JP); Takaaki Haruna, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 11/218,615

(22) Filed: Sep. 6, 2005

(65) Prior Publication Data
US 2006/0230099 A1    Oct. 12, 2006

(30) Foreign Application Priority Data
Apr. 8, 2005    (JP)    ............... 2005-111815

(51) Int. Cl.
G06F 15/167    (2006.01)
G06F 15/16    (2006.01)
G06F 13/00    (2006.01)
G06F 12/00    (2006.01)

(52) U.S. Cl. .................. 709/214; 709/217; 711/113; 707/202

(58) Field of Classification Search .............. 709/214, 709/217–219; 707/202, 205; 711/113
See application file for complete search history.

(56) References Cited

U.S. PATENT DOCUMENTS 5,499,367 A * 3/1996 Bamford et al. ............. 707/8
5,870,355 A * 2/1999 Fujihara .................. 369/30.26
6,775,794 B1 * 8/2004 Horst et al. ................. 714/42
7,047,355 B2 * 5/2006 Nakatani et al. ............ 711/113
7,353,242 B2 * 4/2008 Kodama .................... 707/204

FOREIGN PATENT DOCUMENTS

JP    2002-91825    3/2002

* cited by examiner

*Primary Examiner*—Joseph E Avellino
*Assistant Examiner*—Jeffrey Seto
(74) *Attorney, Agent, or Firm*—Antonelli, Terry, Stout & Kraus, LLP.

(57) ABSTRACT

An object of this invention is to speed up file access and shorten the switching time upon failure. There is provided a computer system with plural storage systems and plural servers, in which: the storage systems each have a disk drive for storing files read/written by the servers and a storage control device, which has an interface connected to the servers via a network and a controller for controlling file read/write in the disk drive; the storage control device and the servers each have a cache memory, which temporarily stores files read/written by the servers, and a file cache control information unit, which keeps information of files stored in the cache memory; and the file cache control information unit holds information indicating whether or not a file is stored in the cache memory of the storage control device and/or the cache memories of the servers.

10 Claims, 20 Drawing Sheets

FIG.5

| FILE CACHE ID | FILE SIZE | LOCK STATE | SERVER 1 IN POSSESSION/ NOT IN POSSESSION | SERVER 1 ACCESS COUNT READ | SERVER 1 ACCESS COUNT WRITE | SERVER 2 IN POSSESSION/ NOT IN POSSESSION | SERVER 2 ACCESS COUNT READ | SERVER 2 ACCESS COUNT WRITE | SERVER 3 IN POSSESSION/ NOT IN POSSESSION | SERVER 3 ACCESS COUNT READ | SERVER 3 ACCESS COUNT WRITE | SERVER 4 IN POSSESSION/ NOT IN POSSESSION | SERVER 4 ACCESS COUNT READ | SERVER 4 ACCESS COUNT WRITE |
|---|---|---|---|---|---|---|---|---|---|---|---|---|---|---|
| 1 | 4KB | UNLOCKED | O | 3 | 1 | × | 3 | 1 | O | 3 | 0 | × | 3 | 1 |
| 2 | 8KB | READ-LOCKED | O | 2 | 1 | O | 2 | 1 | O | 2 | 0 | × | 2 | 1 |
| 3 | 16KB | WRITE-LOCKED | × | 1 | 1 | O | 1 | 1 | O | 1 | 0 | O | 1 | 1 |
| 4 | 1MB | UNLOCKED | × | 3 | 1 | O | 3 | 1 | × | 3 | 0 | O | 3 | 1 |

FILE CACHE CONTROL TABLE (FCCT-S)

FILE CACHE CONTROL TABLE FCCT-N

| FILE CACHE ID | FILE SIZE | LOCK STATE | NAS HEAD 1 IN POSSESSION/ NOT IN POSSESSION | NAS HEAD 1 ACCESS COUNT READ | NAS HEAD 1 ACCESS COUNT WRITE | NAS HEAD 2 IN POSSESSION/ NOT IN POSSESSION | NAS HEAD 2 ACCESS COUNT READ | NAS HEAD 2 ACCESS COUNT WRITE | NAS HEAD 3 IN POSSESSION/ NOT IN POSSESSION | NAS HEAD 3 ACCESS COUNT READ | NAS HEAD 3 ACCESS COUNT WRITE |
|---|---|---|---|---|---|---|---|---|---|---|---|
| 1 | 4KB | UNLOCKED | O | 3 | 0 | × | 3 | 0 | O | 3 | 0 |
| 2 | 8KB | READ-LOCKED | × | 2 | 0 | O | 2 | 0 | × | 2 | 0 |
| 3 | 16KB | WRITE-LOCKED | O | 1 | 0 | × | 1 | 0 | O | 1 | 0 |
| 4 | 1MB | UNLOCKED | × | 3 | 0 | × | 3 | 0 | O | 3 | 0 |

FIG.6

| CASE | FILE SIZE | LOCK STATE | SERVER 1 (SENDER OF REQUEST) | SERVER 2 | SERVER 3 | SERVER 4 | NAS HEAD 1 | NAS HEAD 2 | NAS HEAD 3 |
|---|---|---|---|---|---|---|---|---|---|
| CASE 1 | * | WRITE-LOCKED | * | * | * | * | * | * | * |
| CASE 2 | * | UNLOCKED/READ-LOCKED | ○ | * | * | * | * | * | * |
| CASE 3 | * | UNLOCKED/READ-LOCKED | × | + | ○ | + | * | * | * |
| CASE 4 | * | UNLOCKED/READ-LOCKED | × | × | × | × | * | ○ | * |
| CASE 5 | * | UNLOCKED/READ-LOCKED | × | × | × | × | ○ | × | + |
| CASE 6 | * | UNLOCKED/READ-LOCKED | × | × | × | × | × | × | × |

○ : IN POSSESSION OF AND ACCESS FILE CACHE
+ : IN POSSESSION OF BUT DO NOT ACCESS FILE CACHE
* : WHETHER THE SERVER OWNS FILE CACHE OR NOT IS IRRELEVANT
× : NOT IN POSSESSION OF FILE CACHE

FIG.7

| CASE | FILE SIZE | LOCK STATE | SERVER 1 (SENDER OF REQUEST) | | | SERVER 2 | | | SERVER 3 | | | SERVER 4 | | | NAS HEAD 1 | | | NAS HEAD 2 | | | NAS HEAD 3 | | |
|---|---|---|---|---|---|---|---|---|---|---|---|---|---|---|---|---|---|---|---|---|---|---|---|
| | | | IN POS-SESSION | R | W | IN POS-SESSION | R | W | IN POS-SESSION | R | W | IN POS-SESSION | R | W | IN POS-SESSION | R | W | IN POS-SESSION | R | W | IN POS-SESSION | R | W |
| CASE 11 | * | WRITE-LOCKED | * | * | * | * | * | * | * | * | * | * | * | * | * | * | * | * | * | * | * | * | * |
| CASE 12 | * | UNLOCKED | * | * | * | * | * | * | * | * | * | * | * | * | * | * | * | * | * | * | * | * | * |
| CASE 13 | * | UNLOCKED | * | * | * | * | 5 | 0 | * | 7 | 3 | * | * | * | * | * | * | * | * | * | * | * | * |
| CASE 14 | * | UNLOCKED | * | * | * | * | * | * | * | * | * | * | 5 | 0 | * | 2 | 3 | * | * | * | * | * | * |
| CASE 15 | * | UNLOCKED | * | * | * | * | * | * | * | * | * | * | * | * | * | * | * | * | * | * | * | * | * |

FIG.10

FILE CACHE-CONTROLLABLE COMPUTER SYSTEM

CLAIM OF PRIORITY

The present application claims priority from Japanese patent application P2005-111815 filed on Apr. 8, 2005, the content of which is hereby incorporated by reference into this application.

BACKGROUND

This invention relates to a computer system and, more specifically, a technique of controlling file caches in a computer system that includes a network attached storage system (NAS).

There has been proposed a computer system with NAS (Network Attached Storage), a storage system that is hooked up to a network and connected to plural servers via the network, thus enabling the servers to share files. In this type of computer system, a cache memory is provided in the network to speed up access to disks.

A technique related to such a network cache memory has been disclosed in JP 2002-91825 A, for example. According to this technique, when a file requested from a terminal is not found in a file storing portion of the cache memory, the requested file is obtained from a server and stored in the file storing portion if there is a space in the file storing portion and, if there is no space available, files are deleted from the file storing portion in the reverse order of priority and in reverse chronological order of last referred time to make room for the file obtained from the server.

SUMMARY

In a computer system having a network cache memory as the one described above, cache information is not shared between servers and between a storage system and servers, which lowers the computer system's overall efficiency of controlling file caches. Since the servers and the storage system do not cooperate in managing file caches, a server cannot access data in another server and has to access a disk instead. This makes performance low.

A countermeasure is to produce as little dirty data (data that has been updated in a global cache but not in a shared disk) as possible by frequently writing dirty data in the disk drive at check points. However, this increases the IO count and lowers the performance.

Another problem of a computer system having a network cache memory as the one described above is the absence of a redundant file cache since it prolongs the time to finish failover after a failure. No redundant file cache means that there is no global cache on standby, and therefore it takes long to switch the system upon occurrence of a failure.

When a failure occurs in a device that has a cache memory while the device is in possession of dirty data, the dirty data cannot be recovered. In such cases, recovery of the computer system takes a long time.

It is therefore an object of this invention to speed up file access and shorten the switching time upon failure.

In order to achieve the above object, an embodiment of this invention provides a computer system with plural storage systems and plural servers, in which: the storage systems each have a disk drive for storing files read/written by the servers and a storage control device, which has an interface connected to the servers via a network and a controller for controlling file read/write in the disk drive; the storage control device and the servers each have a cache memory, which temporarily stores files read/written by the servers, and a file cache control information unit, which keeps information of files stored in the cache memory; and the file cache control information unit holds information indicating whether or not a file is stored in the cache memory of the storage control device and/or the cache memories of the servers.

The servers and NAS heads each have a file cache control information unit where a file cache access state is stored to be shared between the servers, between the NAS heads, and between the servers and the NAS heads. When accessing a file, a server refers data stored in its file cache control information unit and, if the file is likely to be accessed by other servers, transfers the file to other servers to be stored in their cache memories. Similarly, a NAS head refers data stored in its file cache control information unit and transfers a file cache to other NAS heads.

In another embodiment of this invention, a computer system has plural active servers and one or more standby servers, and cache memories of the plural servers constitute global caches, an active global cache by active servers and a standby global cache by one or more standby servers, thus obtaining file cache redundancy.

According to an embodiment of this invention, the number of times a server accesses a disk drive can be lowered and the processing performance is accordingly improved. In addition, when a failure occurs in a server or a storage system, the switching is completed within a short period of time because of the presence of redundant file caches.

BRIEF DESCRIPTION OF THE DRAWINGS

The present invention can be appreciated by the description which follows in conjunction with the following figures, wherein:

FIG. 5 is a configuration diagram of FCCT-S in the first embodiment of this invention;

FIG. 6 is a configuration diagram of FCCT-N in the first embodiment of this invention;

FIG. 7 is an explanatory diagram showing case by case how a device operates in read processing of the first embodiment of this invention depending on whether the device owns a file cache or not;

FIG. 10 is an explanatory diagram showing case by case how a device operates in write processing of the first embodiment of this invention depending on whether the device owns a file cache or not;

DETAILED DESCRIPTION OF THE PREFERRED EMBODIMENTS

Embodiments of this invention will be described below with reference to the accompanying drawings.

First Embodiment

Figure 1:
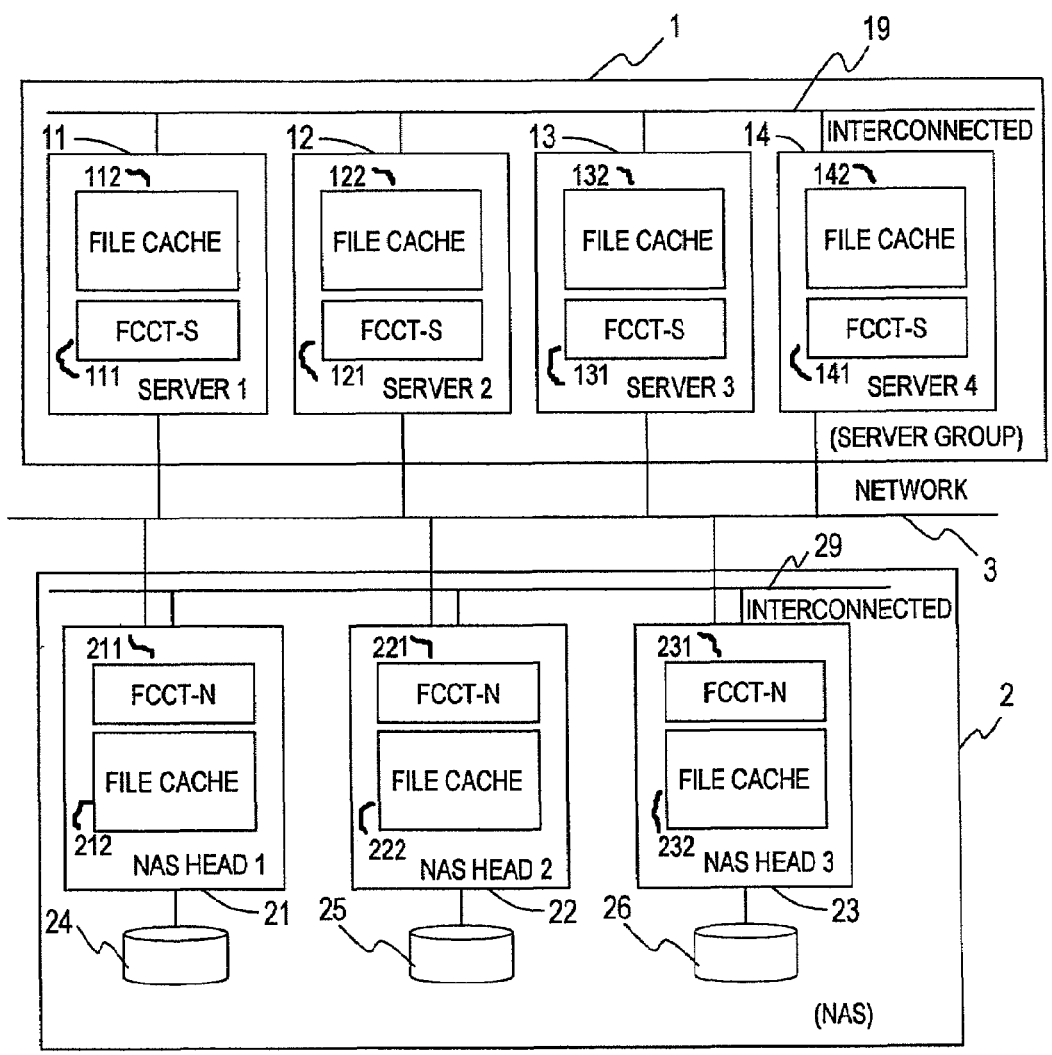
FIG. 1 is a block diagram showing a hardware configuration of a computer system according to a first embodiment of this invention.

FIG. 1 is a block diagram showing a hardware configuration of a computer system according to a first embodiment.

The computer system of the first embodiment has a server group 1, a network attached storage (NAS) 2, and a network 3.

The server group 1 has plural servers denoted by 11 to 14. The servers 11 to 14 are internally connected by an interconnecting line 19 to constitute a cluster. The server 11 has a file cache control table (FCCT-S) 111 and a file cache 112.

The file cache 112 temporarily stores a file accessed by the server 11. The FCCT-S 111 holds information on a file stored in the file cache 112. In other words, the FCCT-S 111 is used to manage file access history as shown in FIG. 5.

The servers 12 to 14 have the same configuration as the server 11.

The NAS 2 has NAS heads 21 to 23 and disk drives 24 to 26. The NAS heads 21 to 23 are internally connected by an interconnecting line 29 to constitute a cluster. The NAS head 21 has a file cache control table (FCCT-N) 211 and a file cache 212. The disk drive 24 is connected to the NAS head 21.

The file cache 212 temporarily stores a file accessed by the server group 1. The FCCT-N 211 holds information on a file stored in the file cache 212. In other words, the FCCT-N 211 is used to manage file access history.

The NAS heads 22 and 23 have the same configuration as the NAS head 21.

The network 3 connects the servers 11 to 14 of the server group 1 and the NAS heads 21 to 23 of the NAS 2 to one another. The network 3 is a LAN built from, for example, Ethernet over which communications are made by a TCP/IP protocol.

Figure 2:
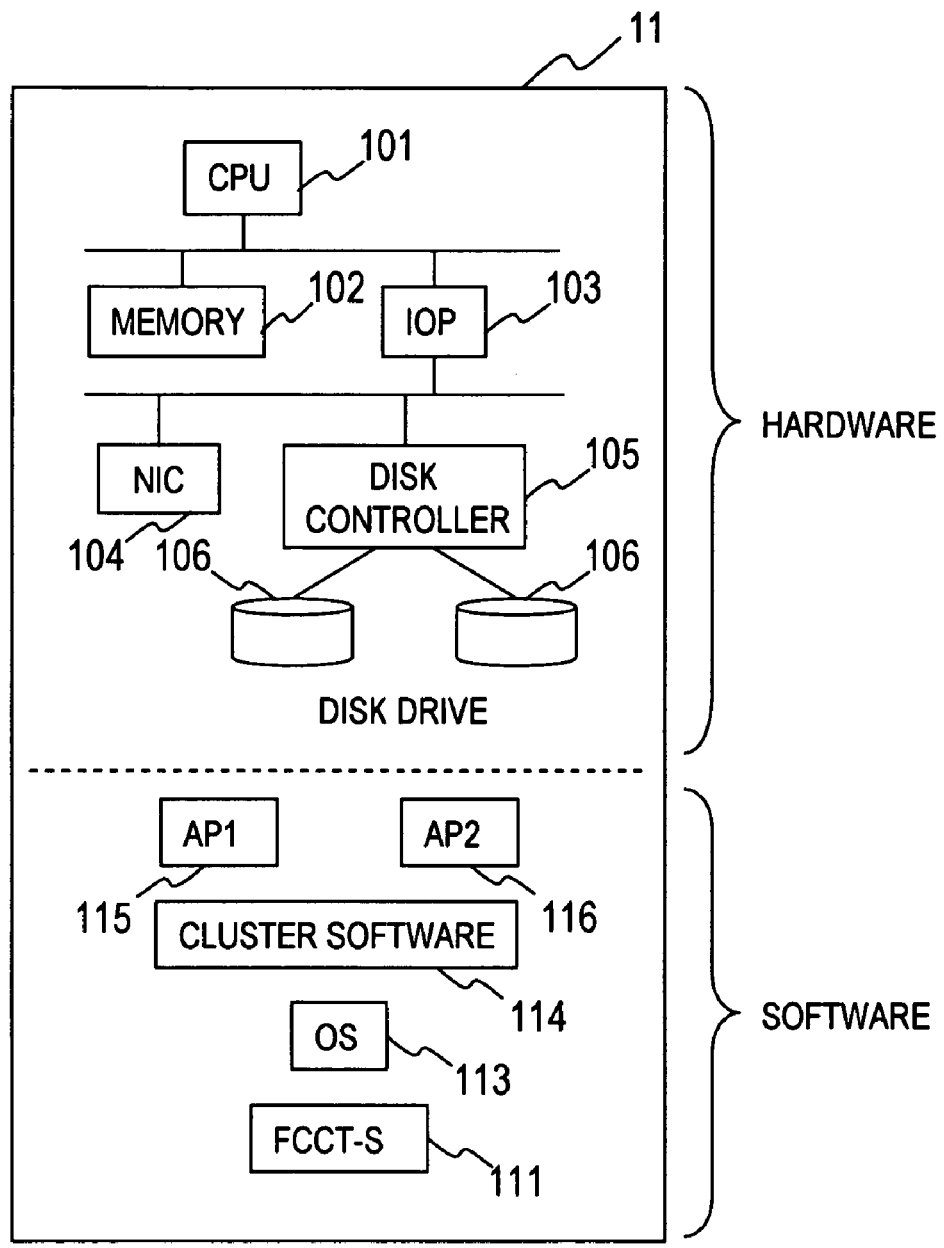
FIG. 2 is a block diagram showing a server configuration in the first embodiment of this invention.

FIG. 2 is a block diagram showing the configuration of the server 11 according to the first embodiment.

The servers 12 to 14 have the same configuration as the server 11.

The server 11 has a CPU 101, a memory 102, an IO processor (IOP) 103, a network interface (NIC) 104, a disk controller 105, and disk drives 106.

The CPU 101 executes programs stored in the memory 102 to perform various types of computing processing.

The memory 102 stores programs and data necessary for the CPU 101 to operate. A part of the storage area of the memory 102 is a cache memory used as the file cache 112. The memory 102 also stores the FCCT-S 111.

The IO processor (IOP: Input Output Processor) 103 is a processor to control input/output of data in the server 11.

The network interface (NIC: Network Interface Controller) 104 is connected to the network 3. The network interface 104 communicates data with other devices connected to the network 3 by, for example, a TCP/IP protocol.

The disk controller 105 controls input/output of data in the disk drives 106. The disk drives 106 store programs and data necessary for the server 11 to operate.

An operating system (OS) 113, cluster software 114, and application programs AP1 denoted by 115 and AP2 denoted by 116 are running on the server 11.

The cluster software 114 balances the load among the servers 11 to 14, and controls switching of operation from one to another of the servers 11 to 14. The application programs 115 and 116 are, for example, a database program and a WEB server program. The application programs 115 and 116 provide these services to users.

Figure 3:
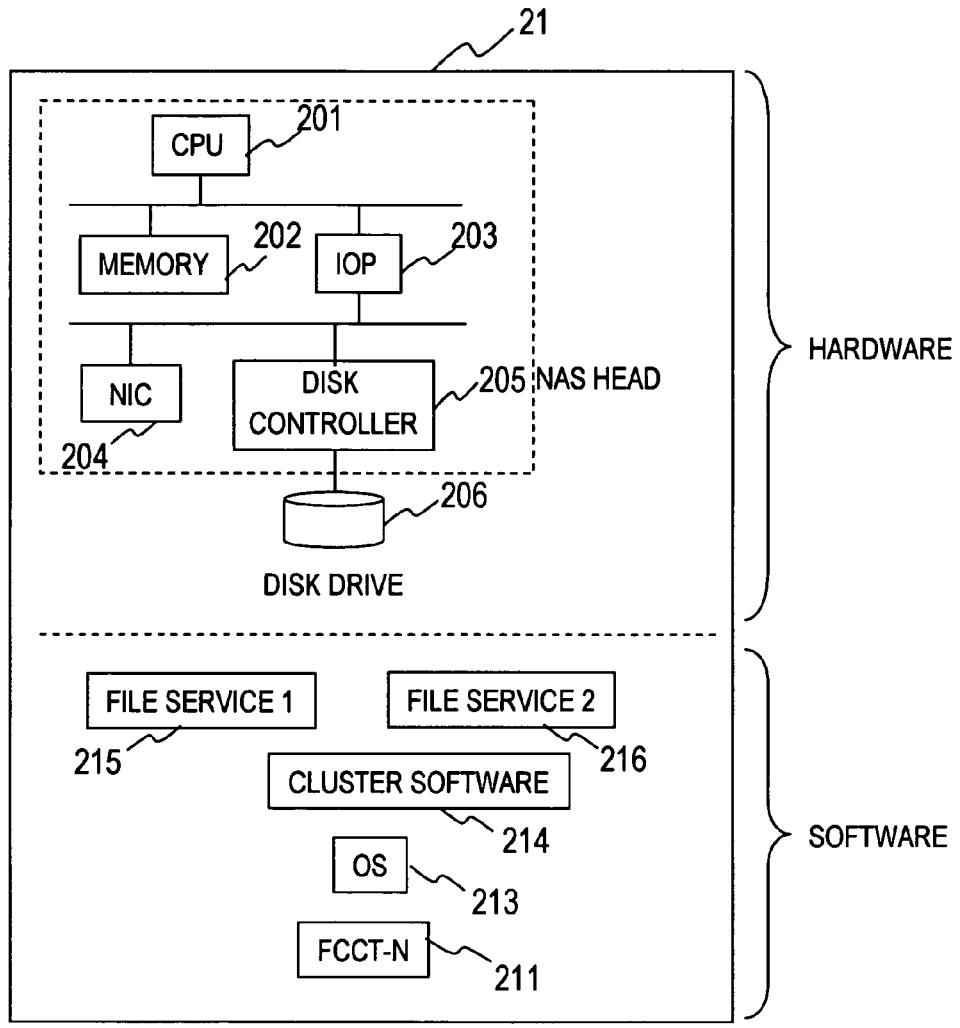
FIG. 3 is a block diagram showing a NAS head configuration in the first embodiment of this invention.

FIG. 3 is a block diagram showing the configuration of the NAS head 21 according to the first embodiment.

The NAS heads 22 and 23 have the same configuration as the NAS head 21.

The NAS head 21 has a CPU 201, a memory 202, an IO processor (IOP) 203, a network interface (NIC) 204, and a disk controller 205.

The CPU 201 executes programs stored in the memory 202 to perform various types of computing processing.

The memory 202 stores programs and data necessary for the CPU 201 to operate. A part of the storage area of the memory 202 is a cache memory used as the file cache 112. The memory 202 also stores the FCCT-N 212.

The IO processor (IOP: Input Output Processor) 203 is a processor to control input/output of data in the NAS head 21.

The network interface (NIC: Network Interface Controller) 204 is connected to the network 3. The network interface 204 communicates data with other devices connected to the network 3 by, for example, a TCP/IP protocol.

The disk controller 205 controls input/output of data in the disk drive 24. The disk drive 24 stores data used by the server group 1. Examples of data stored in the disk drive 24 include a database accessed by a database program and contents information accessed by a WEB server program.

An operating system (OS) 213, cluster software 214, and file service programs 215 and 216 are running on the NAS head 21.

The cluster software 214 balances the load among the NAS heads 21 to 23, and controls switching of operation from one to another of the NAS heads 21 to 23. The file service programs 215 and 216 provide such file systems as SAMBA and NFS to the servers 11 to 14.

Figure 4:
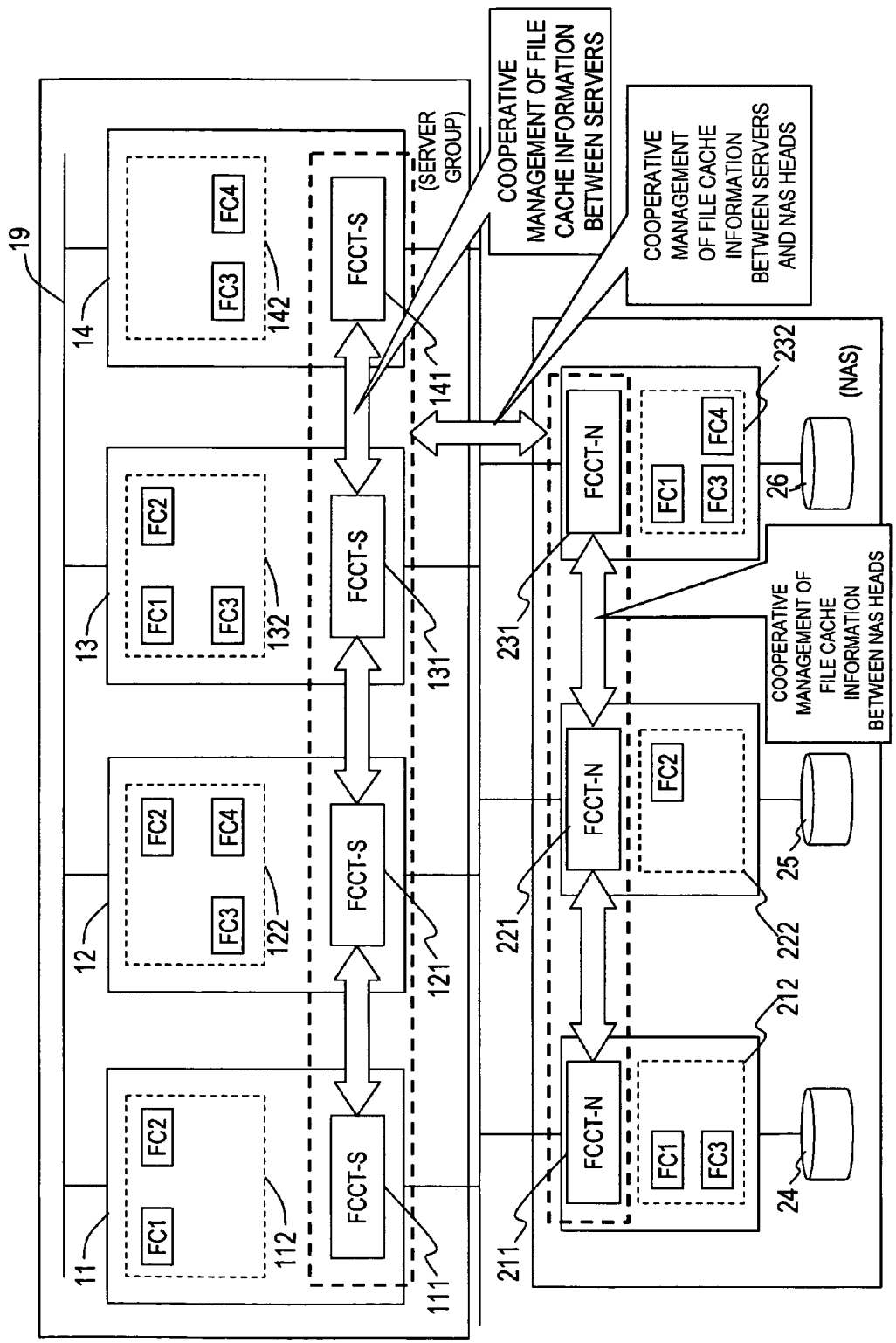
FIG. 4 is an explanatory diagram of this invention's characteristics according to the first embodiment of this invention.

FIG. 4 is an explanatory diagram of this invention's characteristics according to the first embodiment.

Each of the servers 11 to 14 transfers file cache information stored in its own FCCT-S to the other servers, so file cache information is managed by the servers 11 to 14 cooperatively. Either pull transfer or push transfer can be employed by the servers to transfer file cache information.

Through transfer of file cache information, the file cache 112 of the server 11, a file cache 122 of the server 12, a file cache 132 of the server 13, and a file cache 142 of the server 14 together constitute a global cache.

Each of the NAS heads 21 to 23 transfers file cache information stored in its own FCCT-N to the other NAS heads, so file cache information is managed by the NAS heads 21 to 23 cooperatively. As is true for the servers 11 to 14, either pull transfer or push transfer can be employed by the NAS heads to transfer file cache information.

File cache information stored in FCCT-S and file cache information stored in FCCT-N are also transferred among the servers 11 to 14 and the NAS heads 21 to 23, so the servers and the NAS heads manage file cache information cooperatively.

Described next are file cache control tables (FCCT-S and FCCT-N) in the first embodiment.

FIG. 5 is a configuration diagram of FCCT-S in the first embodiment.

The FCCT-S shown in FIG. 5 is distributed among the servers 11 to 14 to be stored. In other words, information of each file cache is stored in one specific server. The servers store pointers to indicate which file cache information is stored in which server.

For instance, information of a file cache may be stored in a round robin manner in which the servers take turns to store the information. To give another example, a server that stores in its cache memory a file that has never been stored in other servers may store information of the file cache.

The FCCT-S contains a file cache ID 1111, a file size 1112, a lock state 1113, in possession/not in possession information 1114, a read count 1115, and a write count 1116. The file cache ID 1111, the file size 1112, and the lock state 1113 are information common to the servers. On the other hand, what are stored as the in possession/not in possession information 1114, the read count 1115, and the write count 1116 vary from one server to another.

The file cache ID 1111 indicates an identifier unique to a file stored in a file cache. The file size 1112 indicates the size of this file. The file size 1112 is used to judge whether to transfer the file or not.

The lock state 1113 indicates whether access to this file is prohibited or not. Specifically, there are three lock states, an unlocked state, a read lock state, and a write lock state. A file in an unlocked state can be read and written both. A read lock state is a state in which a server is accessing a file to read, and a file in a read lock state can be read but not written. A write lock state is a state in which a server is accessing a file to write, and a file in a write lock state cannot be read nor written.

The in possession/not in possession information 1114 indicates whether or not this file is stored in the file cache of a server in question. Which server owns this file cache can be known from the in possession/not in possession information 1114.

The read count 1115 indicates the number of times this file is read (read-accessed) by a server in question. The write count 1116 indicates the number of times this file is written (write-accessed) by a server in question. The access trend of the file (for example, whether the file is read more than written or the file is written more than read) can be known from the read count 1115 and the write count 1116.

The file access history (the read count 1115 and the write count 1116) is used to predict the future access trend.

The FCCT-S may also contain information on other file attributes than the ones mentioned above (for example, information on whether a cache is clean or dirty).

FIG. 6 is a configuration diagram of FCCT-N in the first embodiment.

The FCCT-N shown in FIG. 6 is distributed among the NAS heads 21 to 23 to be stored. In other words, information of each file cache is stored in one specific NAS head. The NAS heads store pointers to indicate which file cache information is stored in which NAS head.

For instance, a NAS head that stores in its cache memory a file that has never been stored in other NAS heads may store information of the file cache. To give another example, information of a file cache may be stored in a round robin manner in which the NAS heads take turns to store the information.

The FCCT-N contains a file cache ID 2111, a file size 2112, a lock state 2113, in possession/not in possession information 2114, a read count 2115, and a write count 2116. The file cache ID 2111, the file size 2112, and the lock state 2113 are information common to the NAS heads. On the other hand, what are stored as the in possession/not in possession information 2114, the read count 2115, and the write count 2116 vary from one server to another.

The file cache ID 2111 indicates an identifier unique to a file stored in a file cache. The file size 2112 indicates the size of this file. The file size 2112 is used to judge whether to transfer the file or not.

The lock state 2113 indicates whether access to this file is prohibited or not. Specifically, there are three lock states, an unlocked state, a read lock state, and a write lock state. A file in an unlocked state can be read and written both. A read lock state is a state in which a server is accessing a file to read, and a file in a read lock state can be read but not written. A write lock state is a state in which a server is accessing a file to write, and a file in a write lock state cannot be read nor written.

The in possession/not in possession information 2114 indicates whether or not this file is stored in the file cache of a NAS head in question. Which NAS head owns this file cache can be known from the in possession/not in possession information 2114.

The read count 2115 indicates the number of times this file is read (read-accessed) by a NAS head in question. The write count 2116 indicates the number of times this file is written (write-accessed) by a NAS head in question. The access trend of the file (for example, whether the file is read more than written or the file is written more than read) can be known from the read count 2115 and the write count 2116.

The file access history (the read count 2115 and the write count 2116) is used to predict the future access trend.

The FCCT-N may also contain information on other file attributes than the ones mentioned above (for example, information on whether a cache is clean or dirty).

FIG. 7 is an explanatory diagram showing case by case how a device operates in read processing of the first embodiment depending on whether the server owns a file cache or not.

The circle symbol in FIG. 7 indicates that a device in question owns a cache of a file access to which is requested and that the file is accessed. The symbol "+" indicates that while a device in question owns a cache of a file access to which is requested, the file is not accessed. The symbol "*" indicates that whether a device in question owns a file cache or not is irrelevant. The symbol "×" indicates that a device in question does not own a cache of a file access to which is requested.

In Case 1, the requested file is in a write lock state and the file is not read irrespective of whether it is a server or NAS head that owns a cache of the file.

Case 2 is a case where the requested file is in an unlocked state or a read lock state, and Server One, which is the sender of the request, is in possession of a cache of the file for which the read request is made. In Case 2, the sender of the request reads the file stored in the own server. In other words, in Case 2, the sender of the request cuts the response time short by accessing the file stored in the own server irrespective of whether other servers or NAS heads own a cache of the file for which the read request is made.

Case 3 is a case where the requested file is in an unlocked state or a read lock state, and Server One, which is the sender of the request, is not in possession of a cache of the file for which the read request is made, and other servers than Server One, which is the sender of the request is in possession of a cache of the file for which the read request is made. In Case 3, the sender of the request reads the file stored in (one of) other servers. When plural servers own a cache of the file for which the read request is made, the file is read out of a server that is estimated to be quick to respond (for example, a server where the load is small), in this example, Server Three. In other words, in Case 3, the sender of the request cuts the response time short by choosing, out of other servers, Server Three, which has a smaller load, and accessing the file stored in Server Three irrespective of whether or not NAS heads own a cache of the file for which the read request is made.

Case 4 is a case where the requested file is in an unlocked state or a read lock state, none of the servers has a cache of the file for which the read request is made, and NAS Head Two, which is accessed preferentially (because it is connected to a disk drive that stores the file), owns a cache of the file for which the read request is made. In Case 4, the sender of the request reads the file stored in NAS Head Two. In other words, in Case 4, the response time is made shorter by accessing, through the file cache of NAS Head Two, the file for which the read request is made than by accessing a disk drive.

Case 5 is a case where the requested file is in an unlocked state or a read lock state, none of the servers has a cache of the file for which the read request is made, NAS Head Two, which is accessed preferentially (because it is connected to a disk drive that stores the file), does not own a cache of the file for which the read request is made, and (one of) other NAS heads own a cache of the file for which the read request is made. In Case 5, the sender of the request reads the file stored in a NAS head or NAS heads other than NAS Head Two. When plural NAS heads own a cache of the file for which the read request is made, the file is read out of a NAS head that is estimated to be quick to respond (for example, a NAS head where the load is small), in this example, NAS Head One. In other words, in Case 5, the response time is made shorter by accessing the file stored in a NAS head that owns a cache of the file for which the read request is made than by accessing a disk drive.

Case 6 is a case where the requested file is in an unlocked state or a read lock state, and none of the servers and NAS heads has a cache of the file for which the read request is made. In Case 6, a disk drive is accessed since the file to be read is not in the cache.

Where to access to obtain a requested file in the respective cases is summarized as follows:

Case 1: The file is not accessed
Case 2: Cache memory of own server
Case 3: Cache memory of one of other servers
Case 4: Cache memory of corresponding NAS head
Case 5: Cache memory of one of other NAS heads than corresponding one
Case 6: disk FIG. 8 is a diagram showing a read processing access order in the respective cases according to the first embodiment.

Figure 8:
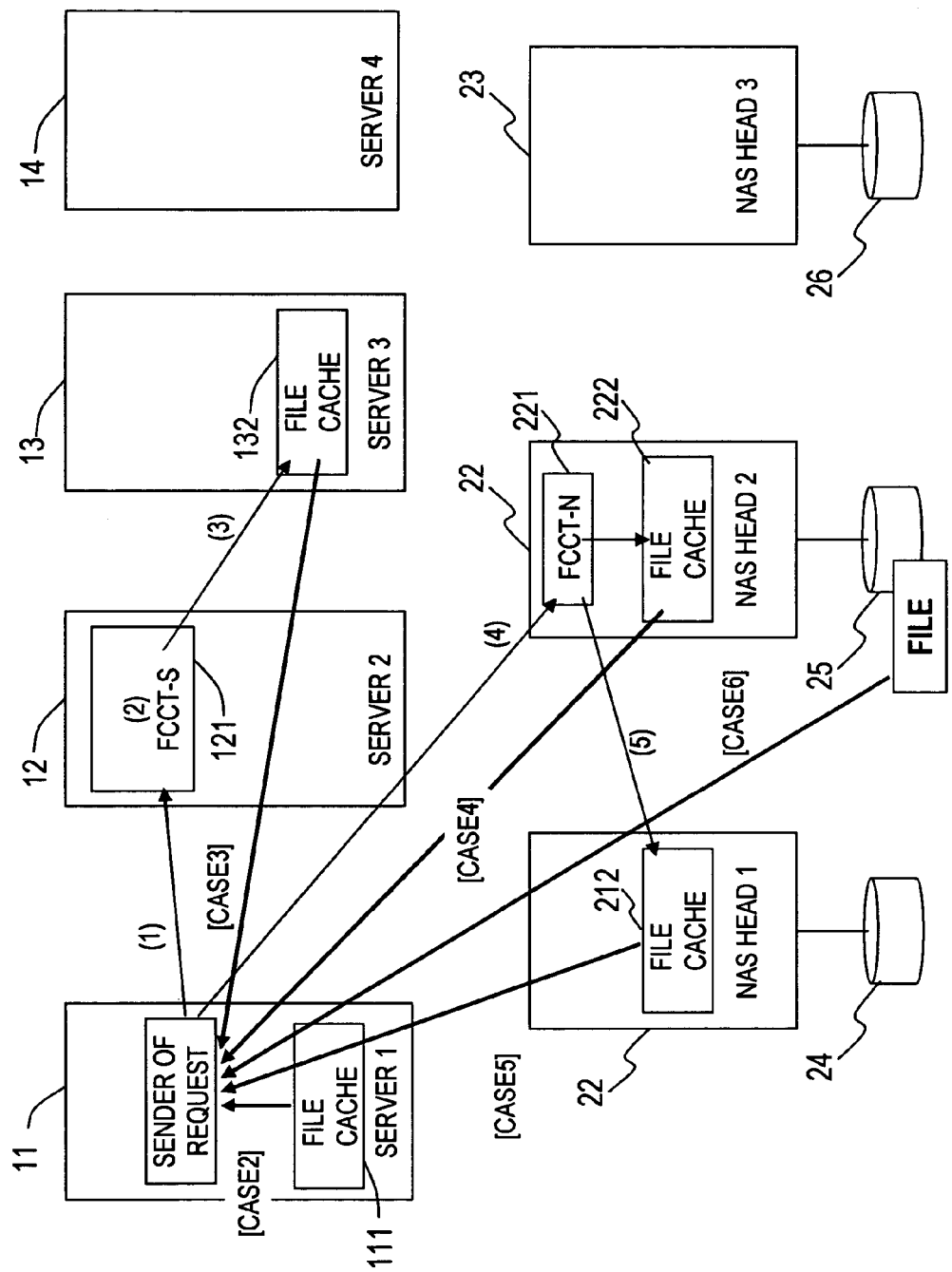
FIG. 8 is a diagram showing a read processing access order in the respective cases according to the first embodiment of this invention.

FIG. 8 illustrates a case in which the server 11 is the sender of a file read request and the objective file is stored in a disk 25, which is connected to NAS Head Two.

First, the server 11 (Server One), which is the sender of the request, checks the file cache of the own server unless the objective file is in a read lock state. When the objective file is found in the file cache of the own server, the file is read out of the file cache 111 (Case 2).

When the objective file is not in the file cache of the own server, the server 11 finds out that Server Two stores FCCT-S in which file cache information of the objective file is written ((1) in FIG. 8), refers the in possession/not in possession data of the FCCT-S about the objective file (2), and finds out that Server Three owns a cache of the objective file. The server 11 then accesses Server Three which is in possession of a cache of the objective file (3), and reads the file out of the file cache 132 (Case 3).

In the case where none of the servers stores the objective file in its file cache, the server 11 finds out that NAS Head Two stores FCCT-N in which file cache information of the objective file is written (that NAS Head Two is connected to the disk 25 where the objective file is stored) (4), and judges whether or not NAS Head Two is in possession of a cache of the objective file. When NAS Head Two owns a cache of the objective file, the file is read out of the file cache 222 (Case 4).

When NAS Head Two is not in possession of a cache of the objective file, the server 11 refers the FCCT-N to find out which of other NAS heads than NAS Head Two has a cache of the objective file. Finding out that NAS Head One has a cache of the objective file, the server 11 accesses NAS Head One (5), and reads the file out of the file cache 212 (Case 5).

In the case where none of the NAS heads has a cache of the objective file, the server 11 accesses the disk 25 via NAS Head Two, and reads the file out of the disk 25 (Case 6).

Figure 9:
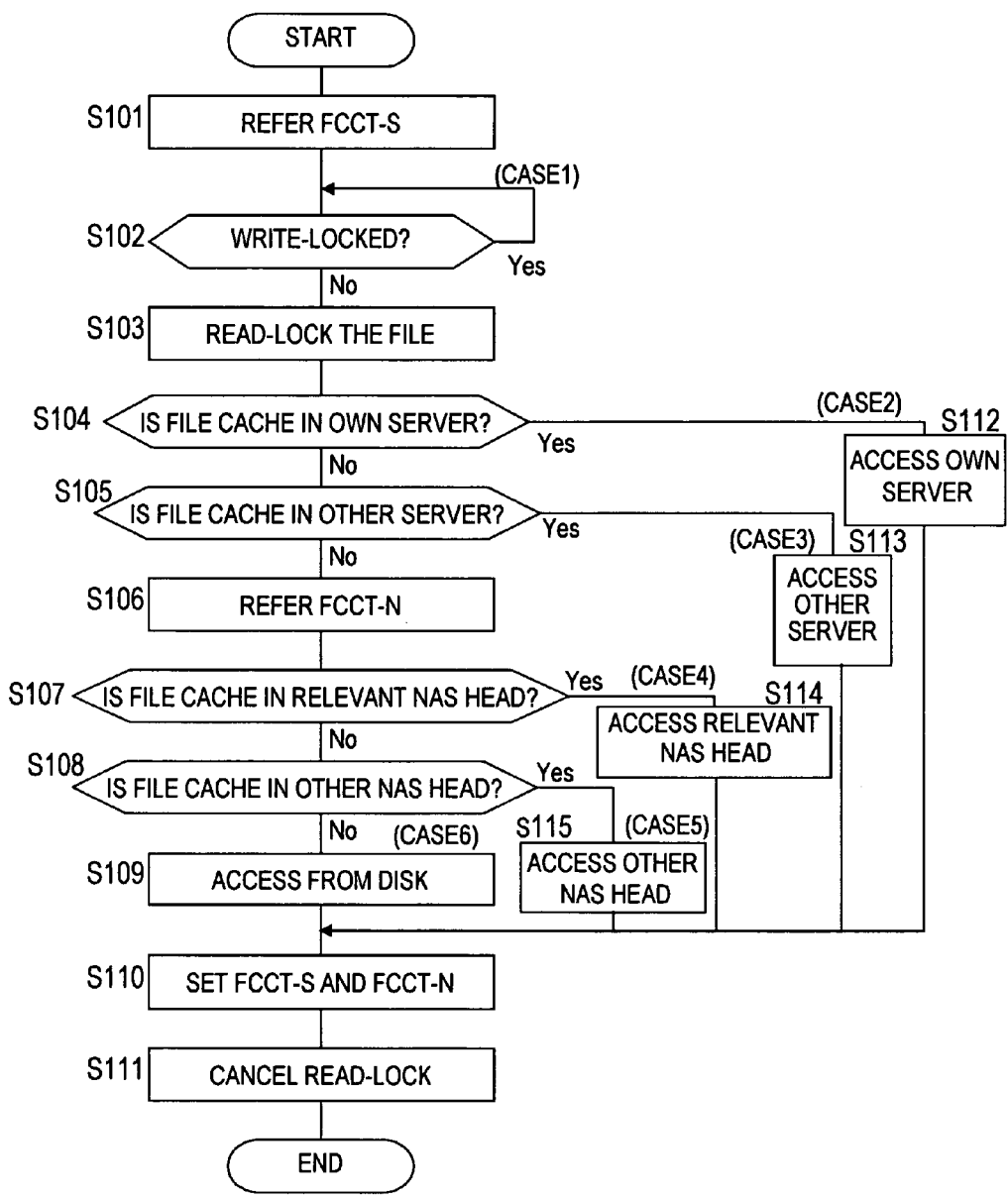
FIG. 9 is a flow chart of read processing according to the first embodiment of this invention.

FIG. 9 is a flow chart of read processing according to the first embodiment.

Upon reception of a file write request from the application programs 115 and 116, the OS 113 first refers the in possession/not in possession 1114 of the FCCT-S (S101). To elaborate, the OS 113 specifies which server stores file cache information of the file for which the read request is made, and asks this server whether it owns the file for which the read request is made to find a server that is in possession of a cache of the requested file.

Next, the OS 113 refers the lock state 1113 in the FCCT-S to judge whether or not the file for which the read request is made is in a write lock state (S102).

When the OS 113 finds as a result that the file for which the read request is made is in a write lock state, it is judged as Case 1. In Case 1, other application programs (other servers than the server of the OS 113) are currently performing write processing on this file, and therefore the OS 113 returns to the step S101 to wait until the write lock is lifted. Alternatively, the OS 113 may terminate the write processing as error after informing the application programs 115 and 116 that the requested file is locked to access.

On the other hand, when it is found in the step S102 that the file for which the read request is made is not in a write lock state, there is no problem in reading the requested file and therefore the requested file is set to a read lock state (S103). To bring the requested file into a read lock state, the OS 113 sends a read lock setting signal to other servers than its own server and to all NAS heads. Thus inconsistencies resulting from accidentally changing the contents of the requested file by letting other application programs read the file can be avoided.

Next, the OS 113 judges, from data obtained by referring the in possession/not in possession 1114 of the FCCT-S in the step S101, whether the file for which the read request is made is in the file cache of its own server or not (S104).

When the OS 113 finds as a result that the requested file is in the file cache of its own server, it is judged as Case 2. In Case Two, the OS 113 reads the file out of the file cache of its own server (S112). The processing then moves to a step S110.

On the other hand, when the OS 113 finds in the step S104 that the file for which the read request is made is not in the file cache of its own server, the processing moves to a step S105.

In the step S105, the OS 113 judges whether or not other servers store the requested file in their file caches.

When the OS 113 finds as a result that one of other servers stores the requested file in its file cache, it is judged as Case 3. In Case 3, the OS 113 accesses this other server and reads the file out of the file cache of this other server (S113). The processing then moves to the step S110.

On the other hand, when the OS 113 finds as a result that none of other servers stores the requested file in its file cache, the processing moves to a step S106. In short, it is judged that none of the servers (including the server 11) stores in its file cache the file for which the read request is made.

The OS 113 next refers the in possession/not in possession 2114 of FCCT-N contained in the NAS heads (S106). To elaborate, the OS 113 specifies which NAS head stores file cache information of the file for which the read request is made, and asks this NAS head whether it is in possession of the file for which the read request is made to find out a NAS head that owns a cache of the requested file.

Next, the OS 113 judges whether or not the file for which the read request is made is stored in the file cache of the NAS head that is connected to a disk drive where the requested file is stored (S107).

When the OS 113 finds as a result that this NAS head stores the requested file in its file cache, it is judged as Case 4. In Case 4, the OS 113 accesses this NAS head and reads the requested file out of the file cache of this NAS head (S114). The processing then moves to the step S110.

On the other hand, when the OS 113 finds in the step S107 that the file for which the read request is made is not in the file cache of the NAS head that is connected to the disk drive where the requested file is stored, the processing moves to a step S108.

In the step S108, the OS 113 judges whether other NAS heads store the requested file in their file caches or not.

When the OS 113 finds as a result that one of other NAS heads stores the requested file in its file cache, it is judged as Case 5. In Case 5, the OS 113 accesses this other NAS head and reads the requested file out of the file cache of this other NAS head (S115). The processing then moves to the step S110.

On the other hand, when the OS 113 finds in the step S108 that none of other NAS heads stores the requested file in its file cache, the processing moves to a step S109. In short, it is judged that none of the servers and NAS heads stores in its file cache the file for which the read request is made (Case 6).

In the step S109, the OS 113 accesses the NAS head that is connected to the disk drive where the requested file is stored, and reads the file for which the read request is made out of the disk drive.

Thereafter, the OS 113 raises the read count in the FCCT-S. The OS 113 changes, if necessary, the file possession state of its own server. The read count in the FCCT-N is also raised (S110).

Then the read lock is unlocked (S111). To unlock the read lock, the OS 113 sends a read lock unlocking signal to other servers than its own server and to all NAS heads. The file from which read lock is lifted is now available for write access from other application programs.

FIG. 10 is an explanatory diagram showing case by case how a device operates in write processing of the first embodiment depending on whether the device owns a file cache or not.

The "R" and "W" symbols in FIG. 10 represent the read count and the write count, respectively. "*" indicates that, in a case in question, whether a device in question owns a file cache or not and the device's access count are irrelevant.

In Case 11, the requested file is in a write lock state and the file is not written irrespective of what the read count and write count of the servers and NAS heads are.

Case 12 is a case where the requested file is in an unlocked state (not in a read lock state nor a write lock state). In Case 12, the file is not written irrespective of what the read count and write count of the servers and NAS heads are. In other words, in Case 12, the sender of the request cuts the response time short by storing, in the cache of the own server, the file for which the write request is made.

Case 13 is a case where the requested file is in an unlocked state and is frequently accessed by other servers than the sender of the request. This example employs "3" as a threshold to judge the frequency of access by other servers (a given value for Conditions 1-1 and 1-2, which will be described later).

In Case 13, Server Three's read count is seven and write count is three, which means that the access count of Server Three is equal to or larger than the threshold. The requested file is therefore written in the cache of Server Three. In Server Two and Server Four, the read count is 5 and exceeds the threshold whereas the write count is zero and smaller than the threshold. The requested file is therefore not written in the caches of Server Two and Server Four.

Case 14 is a case where the requested file is in an unlocked state and the file cached in a NAS head is accessed frequently. This example employs "2" for the read count and "3" for the write count as thresholds to judge the access frequency of other servers than the sender of the request (a given value for Condition 2-1 described later and a given value for Condition 2-2 described later).

In Case 14, the access count of NAS Head One is equal to or larger than the threshold since its read count is two and write count is three. The requested file is therefore written in the cache of NAS Head One. Similarly, the requested file is written in the cache of NAS Head Two. On the other hand, in NAS Head Three, the read count and the write count are both zero and smaller than the respective thresholds. The requested file is therefore not written in the cache of NAS Head Three.

Case 15 is a case where the requested file is in an unlocked state. In Case 15, the file requested to be written is transferred to a NAS head that is connected to a disk drive in which the requested file is to be written, and the file is written in the disk drive.

Where to access to obtain a requested file in the respective cases is summarized as follows:
 Case 11: The file is not accessed
 Case 12: Cache memory of own server
 Case 13: Cache memory of one of other servers
 Case 14: Cache memory of NAS head
 Case 15: disk FIG. 11 is a diagram showing a write processing access order in the respective cases according to the first embodiment.

Figure 11:
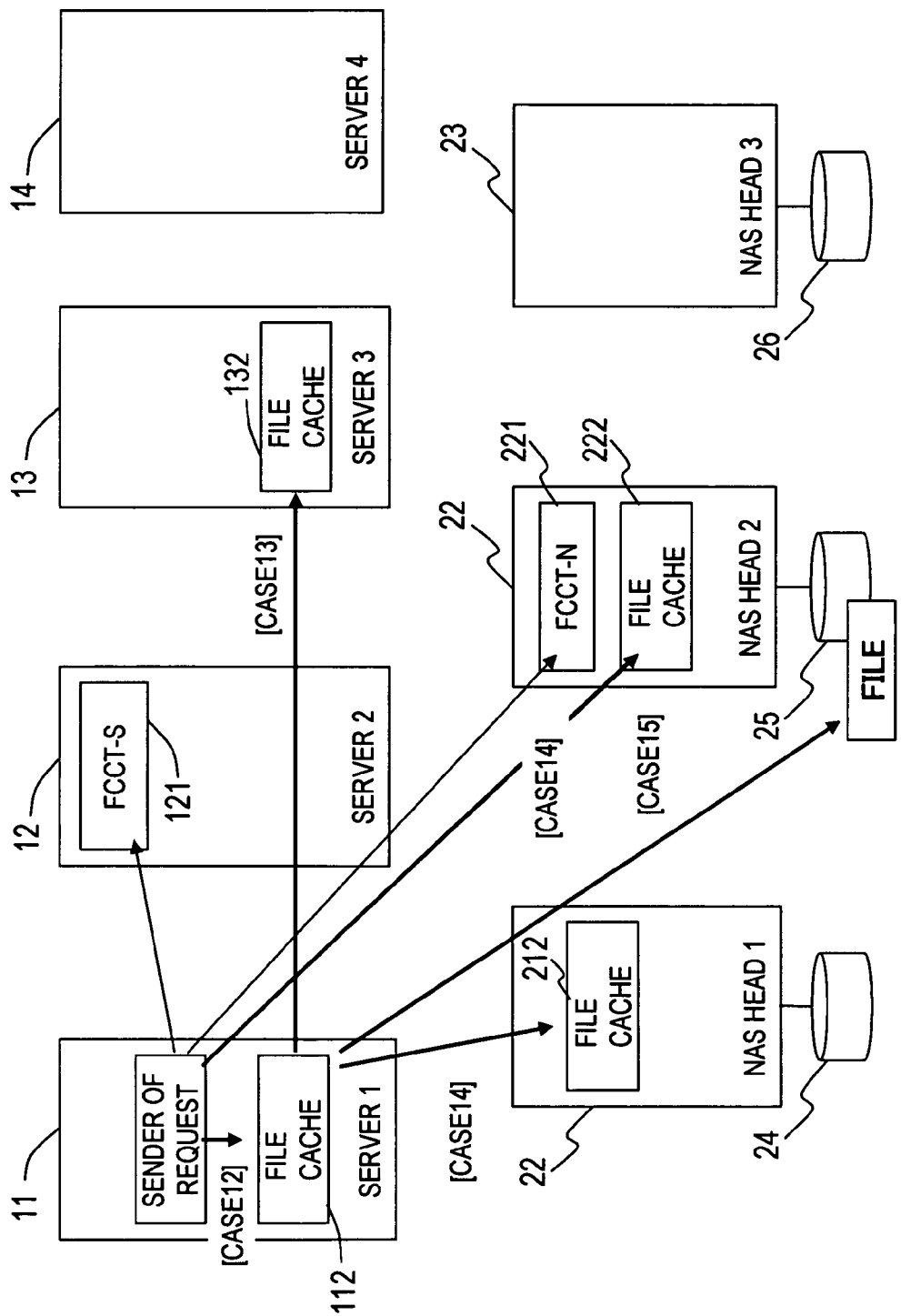
FIG. 11 is a diagram showing a write processing access order in the respective cases according to the first embodiment of this invention.

FIG. 11 illustrates a case in which the server 11 is the sender of a file write request and the objective file is stored in a disk drive 25, which is connected to NAS Head Two.

First, the server 11 (=Server One), which is the sender of the request, writes the objective file in the file cache of the own server unless the objective file is in a locked state (Case 12).

When the objective file is met a condition, the objective file to be stored in the file cache of other servers the server 11 transfers the objective file to the other servers that meet a condition and stores the file in their cache memories (Case 13).

When the objective file is met a condition the objective file to be stored in the file cache of other NAS heads, the server 11 transfers the objective file to the NAS heads that meet a condition and stores the file in their cache memories (Case 14).

A file stored in a cache memory of a server is transferred to a NAS head that is connected to a disk drive where the file is to be stored, and the file is written in the disk drive (Case 15).

In this embodiment, a file stored in a cache is transferred from one server to another to make caches redundant among servers. Similarly, a file stored in a cache is transferred to NAS heads to make caches redundant between NAS heads and servers and between NAS heads.

A procedure of server failure processing will now be described below.

Figure 12:
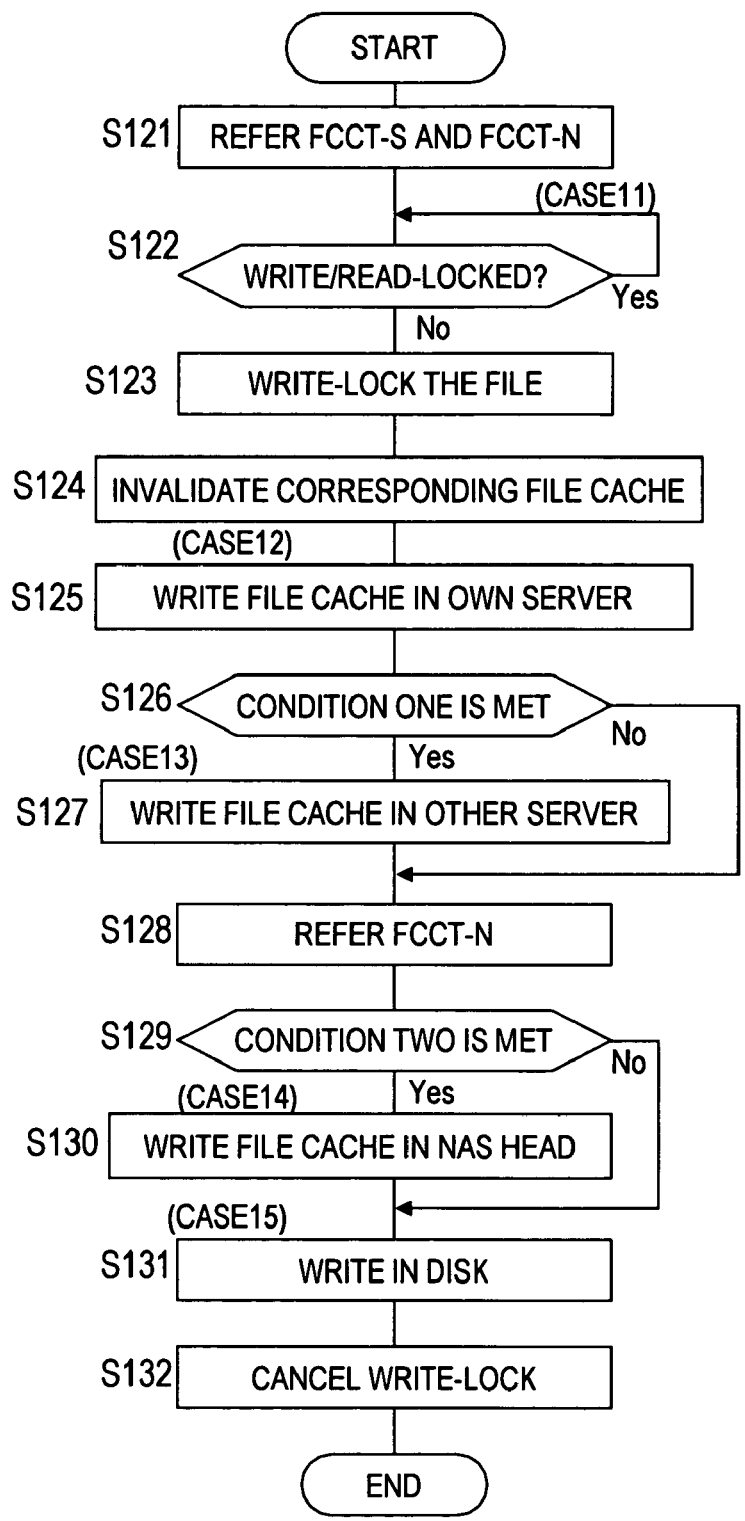
FIG. 12 is a flow chart of write processing according to the first embodiment of this invention.

FIG. 12 is a flow chart of write processing according to the first embodiment.

Upon reception of a file write request from the application programs 115 and 116, the OS 113 first refers the in possession/not in possession 1114 of the FCCT-S and the in possession/not in possession 2114 of the FCCT-N (S121). To elaborate, the OS 113 specifies which server stores file cache information of the file for which the write request is made, and asks this server whether it owns the file for which the write request is made to find a server that is in possession of a cache of the requested file. The OS 113 also specifies which NAS head stores file cache information of the file for which the write request is made, and asks this NAS head whether it owns the file for which the write request is made to find a NAS head that is in possession of a cache of the requested file.

The OS 113 also refers the access counts 1115 and 1116 in the FCCT-S. Specifically, the OS 113 inquires the server that stores file cache information of the file for which the write request is made about the read count and write count of the file for which the write request is made.

Next, the OS 113 refers the lock state 1113 in the FCCT-S to judge whether or not the file for which the write request is made is in a write lock state and whether or not the file is in a read lock state (S122).

When the OS 113 finds as a result that the file for which the write request is made is in a write lock state or in a read lock state, it is judged as Case 11. In Case 11, other application programs (other servers than the server of the OS 113) are currently performing write processing or read processing on this file, and therefore the OS 113 returns to the step S121 to wait until the access lock is lifted. Alternatively, the OS 113 may terminate the write processing as error after informing the application programs 115 and 116 that the requested file is locked to access.

On the other hand, when it is found in the step S122 that the file for which the write request is made is not in a write lock state or in a read lock state, there is no problem in writing the requested file and therefore the requested file is set to a write lock state (S123). To bring the requested file into a write lock state, the OS 113 sends a write lock setting signal to other servers than its own server and to all NAS heads. Thus inconsistencies resulting from accidentally changing the contents of the requested file by letting other application programs read the file can be avoided.

Next, the OS 113 invalidates the file caches of servers and NAS heads that are found as a result of the search conducted in the step S121 with the use of the data of the in possession/not in possession 1114 in the FCCT-S and of the in possession/not in possession 2114 in the FCCT-N (S124). The file caches are invalidated by sending a signal to delete files cached in the found servers and NAS heads.

The OS 113 then writes in the file cache of its own server the file for which the write request is made (S125). This writing processing corresponds to Case 12. With the requested file written in its own file cache, the server 11 judges that writing of the file in a disk drive is completed.

Next, the OS 113 judges for each server whether every item in the following Condition One is met or not (S126).

(1-1) The read count is equal to or larger than a given value.
(1-2) The write count is equal to or larger than a given value.
(1-3) The file size is equal to or smaller than a given value.

When the OS 113 finds as a result that every item in Condition One is met, it is judged as Case 13. In Case 13, the OS 113 transfers the requested file to other servers that meet Condition One, and writes the requested file in the cache memories of these other servers (S127). The OS 113 does not transfer the requested file to other servers if they fail to meet even one item in Condition One, and moves to a step S128.

In the step S128, the OS 113 refers the access counts 2115 and 2116 in the FCCT-N. To elaborate, the OS 113 specifies which NAS head stores file cache information of the file for which the write request is made, and inquires this NAS head about the read count and write count of the file for which the write request is made.

Next, the OS 113 judges for each NAS head whether every item in the following Condition Two is met or not (S129).

(2-1) The read count is equal to or larger than a given value.
(2-2) The write count is equal to or larger than a given value.
(2-3) The file size is equal to or smaller than a given value.

The read count and write count used in judging whether Condition Two is met show the number of times a NAS head in question has accessed the requested file. When the access frequency of the requested file is high, it is effective to give file caches to other NAS heads for redundancy and therefore the requested file is transferred to other NAS heads.

When the OS 113 finds as a result that every item in Condition Two is met, it is judged as Case 14. In Case 14, the OS 113 transfers the requested file to the NAS heads that meet Condition Two, and writes the requested file in the cache memories of these NAS heads (S130). The OS 113 does not transfer the requested file to NAS heads if they fail to meet even one item in Condition Two, and moves to a step S131.

Thereafter, data of the file written in the cache is transferred to a NAS head that is connected to a disk drive where the file is stored, and the data of the file is written in the disk drive (S131).

The OS 113 then unlocks the file's write lock (S132). To lift write lock from the file, the OS 113 sends a write lock unlocking signal to other servers than its own server and to all NAS heads. The file from which write lock is lifted is now available for read access from other application programs.

In the steps S126 and S129, transfer between caches may be limited by considering the file size and the access count combined instead of the results of separately comparing the access count and the file size with their respective given values. For instance, inter-cache transfer may be allowed to only those whose access count/file size exceeds a given threshold.

Figure 13:
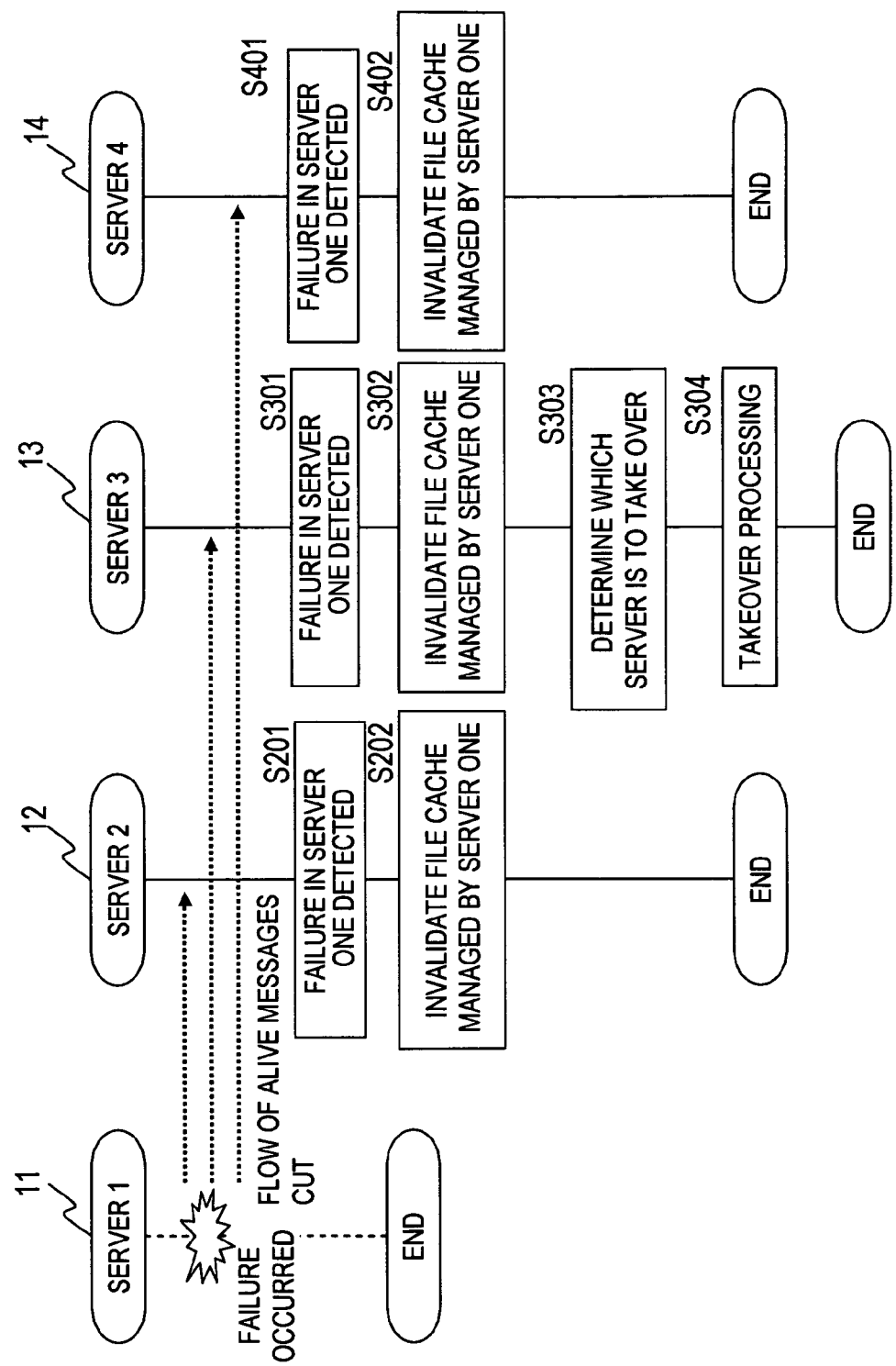
FIG. 13 is a sequence diagram of a server failure processing procedure according to the first embodiment of this invention.

FIG. 13 is a sequence diagram of a server failure processing procedure according to the first embodiment.

Server One to Server Four constitute a cluster. Each server sends out an alive message at given timing (e.g., in two-second cycles). The alive message may concurrently be delivered to all the servers that constitute the cluster. Alternatively, the alive message may be transferred from one server to the next in a predetermined order.

Each server knows, by receiving an alive message, that the server that has sent the alive message is in operation. Also, by receiving no alive messages for longer than a given period of time, each server knows that a failure has occurred in a server.

When a failure occurs in Server One, alive messages are no longer sent from Server One. Server Two detects that a failure has occurred in Server One by the flow of alive messages from Server One being cut off (S201).

Then Server Two invalidates the file cache managed by Server One (S202). For instance, in the example shown in FIG. 4 where Server One manages a file cache (FC1), Server Two invalidates FC1. Not being in possession of FC1, Server Two has no file cache to be invalidated.

The above-described processing of the steps S201 and S202 is also executed in Server Three and Server Four.

Next, Server Three refers the reconstructed FCCT-S to designate, as a takeover server, a server having many files that are also owned by Server One (S303). Designation of a takeover server is executed only in a server that is to take over a service of servers.

Designated as a takeover server, Server Three uses cluster software to activate application programs that have been run on Server One, and starts providing a service that has been provided by Server One (S304).

Figure 14:
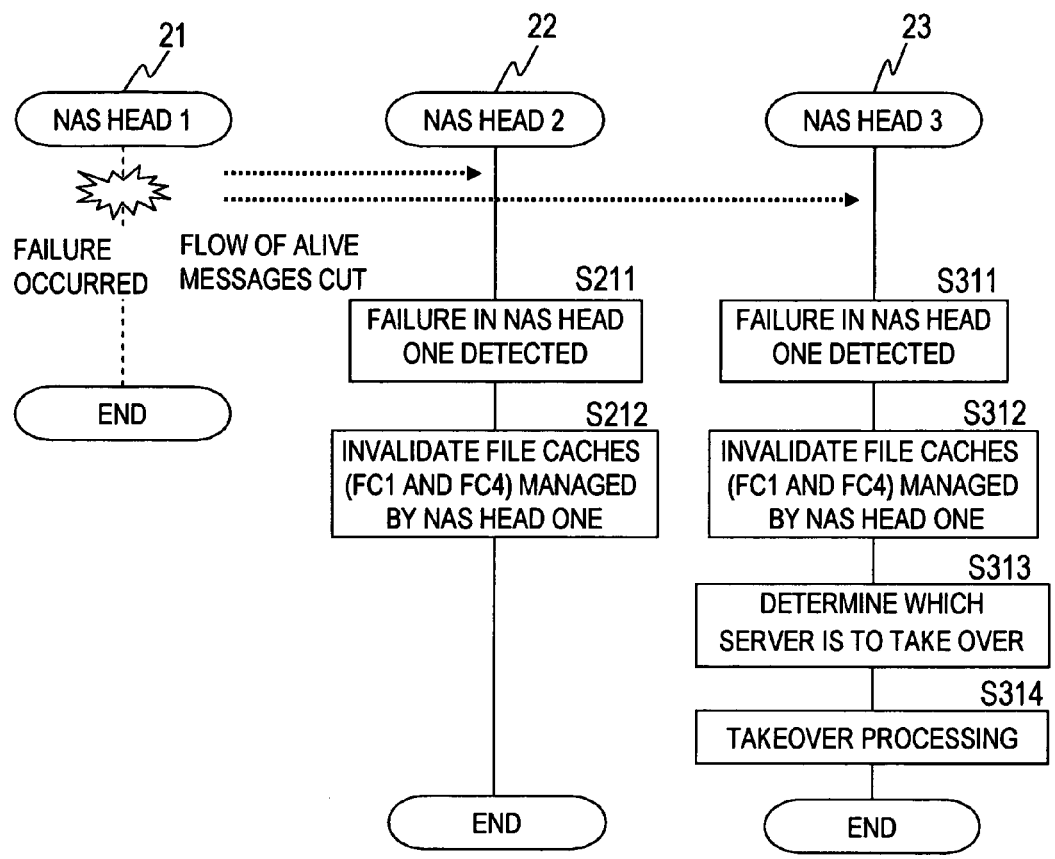
FIG. 14 is a sequence diagram of a NAS head failure processing procedure according to the first embodiment of this invention.

FIG. 14 is a sequence diagram of a NAS head failure processing procedure according to the first embodiment.

NAS head One to NAS head Three constitute a cluster. Each NAS head sends out an alive message at given timing (e.g., in two-second cycles). The alive message may concurrently be delivered to all the NAS heads that constitute the cluster. Alternatively, the alive message may be transferred from one NAS head to the next in a predetermined order.

Each NAS head knows, by receiving an alive message, that the NAS head that has sent the alive message is in operation. Also, by receiving no alive messages for longer than a given period of time, each server knows that a failure has occurred in NAS head.

When a failure occurs in NAS head One, alive messages are no longer sent from NAS head One. NAS head Two detects that a failure has occurred in NAS head One by the flow of alive messages from NAS head One being cut off (S211).

Then NAS head Two invalidates the file cache managed by NAS head One (S212). For instance, in the example shown in FIG. 4 where NAS head One manages a file cache (FC1), Server Two invalidates FC1. Not being in possession of FC1, NAS head Two has no file cache to be invalidated.

The above-described processing of the steps S211 and S212 is also executed in NAS head Three.

Next, NAS head Three refers the reconstructed FCCT-N to designate, as a takeover NAS head, a NAS head having many files that are also owned by NAS head One (S313). Designation of a takeover NAS head is executed only in a NAS head that is to take over a service of NAS head One.

Designated as a takeover NAS head, NAS Head Three uses cluster software to copy data that has been stored in a disk drive connected to NAS Head One, and starts providing data that has been provided by NAS Head One (S314).

As has been described, in the first embodiment of this invention, plural servers constitute a cluster system and a storage system is constituted of plural NAS heads and disk drives. The servers and the NAS heads each have a file cache control table (FCCT), which stores a file cache access state. A file cache access state is exchanged between servers, between NAS heads, and between servers and NAS heads, and is stored in the FCCT. In writing a file, a server refers the contents of the FCCT and, if the file is likely to be accessed by other servers, transfers the file to other servers where the file is stored in their cache memories. Similarly, a NAS head transfers a file cache to other NAS heads. With file caches coordinated between NAS heads and servers through the file cache control tables, the number of times a disk drive is accessed can be lowered and the access performance is thus improved. In addition, when a failure occurs in a server or NAS, the switching is completed within a short period of time because other devices than the failed device have auxiliary file caches. Thus the performance is prevented from dropping and the usability is improved.

Moreover, the optimum file cache redundancy is obtained since a file is stored selectively in caches.

Second Embodiment

A computer system according to a second embodiment of this invention has a common standby server 15 in a server group 1.

Figure 15:
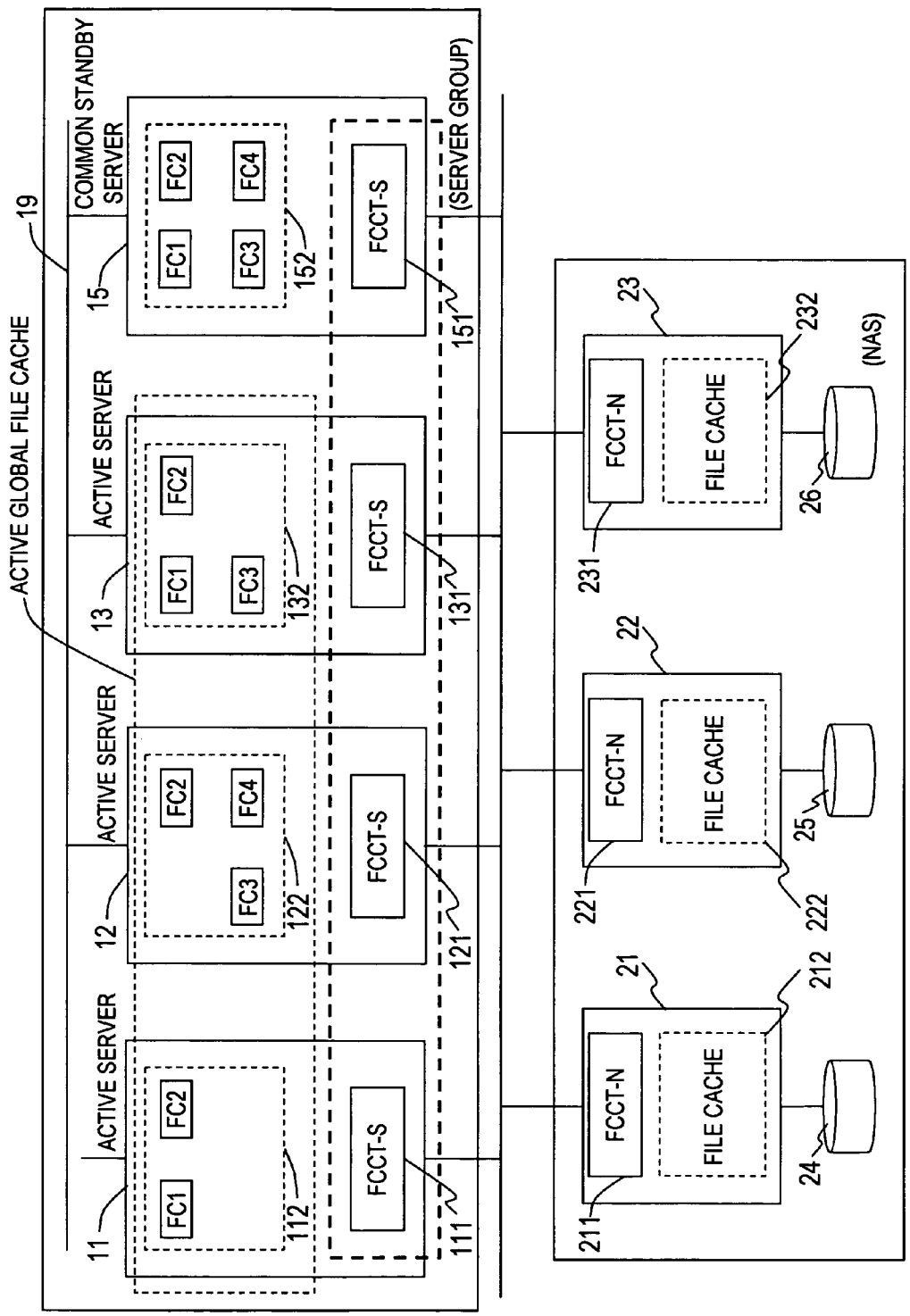
FIG. 15 is a block diagram showing a hardware configuration of a computer system according to a second embodiment of this invention.

FIG. 15 is a block diagram showing the hardware configuration of a computer system according to a second embodiment.

The computer system of the second embodiment has a server group 1, NAS (Network Attached Storage) 2, and a network 3.

The server group 1 has plural servers denoted by 11 to 13 and the server 15. The servers 11 to 13 are active servers, which actually provide services. The server 15 is a common standby server, which takes over a service in case of a failure. FIG. 15 shows one common standby server, but the computer system of the second embodiment may have two or more common standby servers.

The active servers 11 to 13 and the common standby server 15 are internally connected by an interconnecting line 19 to constitute a cluster.

The active server 11 has a file cache control table (FCCT-S) 111 and a file cache 112. The active servers 12 and 13 and the common standby server 15 have the same configuration as the active server 11.

The file cache 112 temporarily stores a file accessed by the active server 11. The FCCT-S 111 holds information on a file stored in the file cache 112. In other words, the FCCT-S 111 is used to manage file access history as shown in FIG. 5.

The file cache 112 of the active server 11, a file cache 122 of the active server 12, and a file cache 132 of the active server 13 together constitute an active global cache.

The FCCT-S of the second embodiment is distributed among the active servers 11 to 13 to be stored. In other words, information of each file cache is stored in one specific server. The servers store pointers to indicate which file cache information is stored in which server.

For instance, information of a file cache may be stored in a round robin manner in which the servers take turns to store the information. To give another example, a server that stores in its cache memory a file that has never been stored in other servers may store information of the file cache.

The common standby server 15 has a file cache control table (FCCT-S) 151 and a file cache 152.

The file cache 152 temporarily stores every file accessed by the active servers 11 to 13. The FCCT-S 151 holds information on files stored in the file cache 152. In other words, the FCCT-S 151 is used to manage the file access history of all the active servers as shown in FIG. 5. The file cache 152 of the common standby server 15 constitutes a standby global cache.

The NAS 2 has NAS heads 21 to 23 and disk drives 24 to 26. The NAS head 21 has a file cache control table (FCCT-N) 211 and a file cache 212. The disk drive 24 is connected to the NAS head 21.

The file cache 212 temporarily stores files accessed by the server group 1. The FCCT-N 211 is used to manage files stored in the file cache 212. In other words, the FCCT-N 211 is used to manage the file access history. The NAS heads 22 and 23 have the same configuration as the NAS head 21.

The network 3 connects the active servers 11 to 13 of the server group 1, the common standby server 15, and the NAS heads 21 to 23 of the NAS 2 to one another. The network 3 is a LAN built from, for example, Ethernet® over which communications are made by a TCP/IP protocol.

Figure 16:
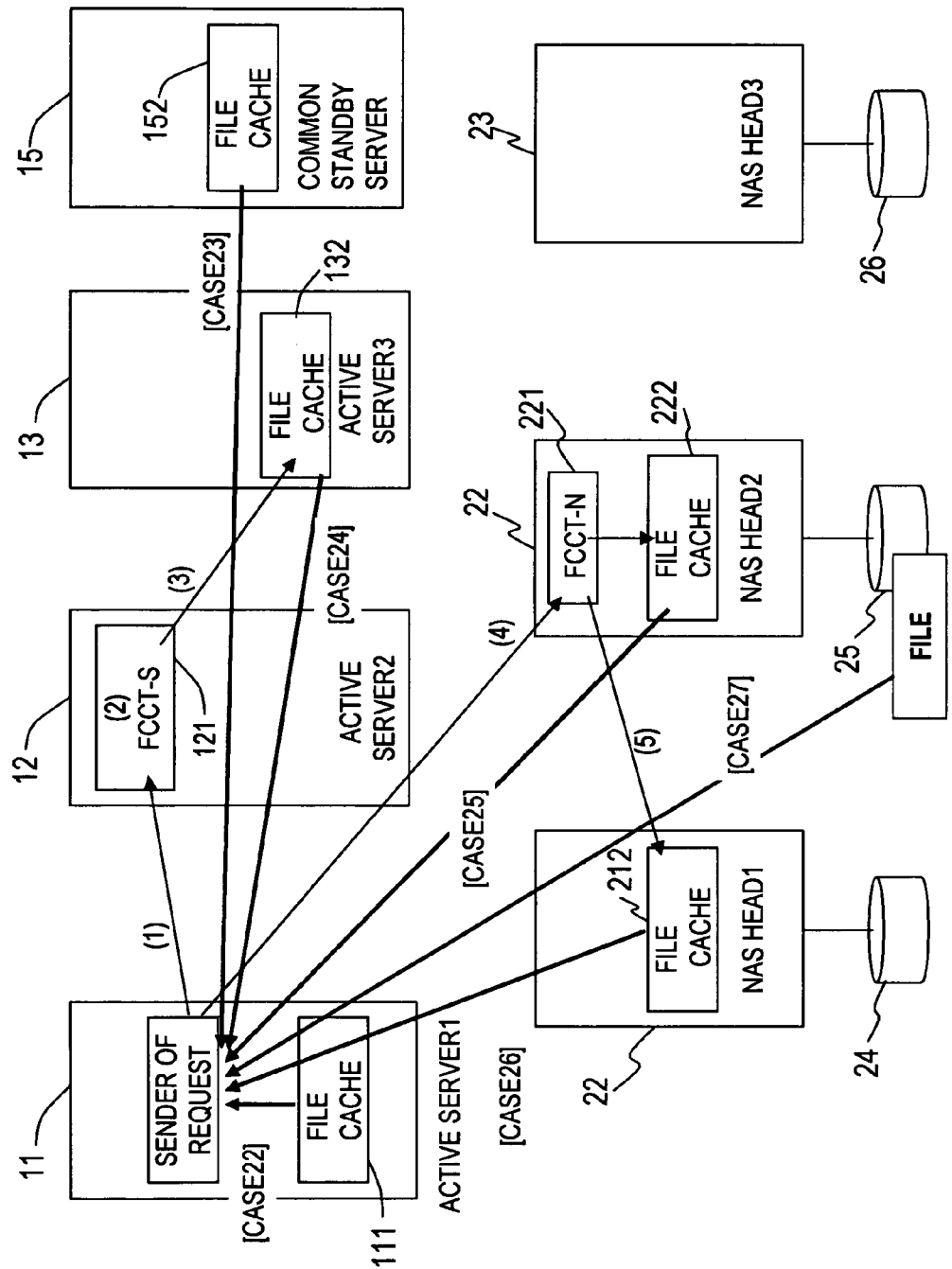
FIG. 16 is a diagram showing a read processing access order in the second embodiment of this invention.

FIG. 16 is a diagram showing a read processing access order in the respective cases according to the second embodiment.

FIG. 16 illustrates a case in which the active server 11 is the sender of a file read request and the objective file is stored in a disk drive 25, which is connected to NAS Head Two.

First, the active server 11 (Server One), which is the sender of the request, checks the file cache of the own server unless the objective file is in a read lock state. When the objective file is found in the file cache of the own server, the file is read out of the file cache 111 (Case 22).

When the objective file is not in the file cache of the own server, the active server 11 confirms that the common standby server 15 is in operation and then accesses the common standby server 15 to read the requested file out of the file cache 152 (Case 23).

In the case where the common standby server 15 is not in operation, the active server 11 finds out that Active Server Two stores FCCT-S in which file cache information of the objective file is written ((1) in FIG. 16), refers the in possession/not in possession data of the FCCT-S about the objective file (2), and finds out that Active Server Three owns a cache of the objective file. The active server 11 then accesses Active Server Three which is in possession of a cache of the objective file (3), and reads the file out of the file cache 132 (Case 24).

In the case where none of the active servers stores the objective file in its file cache, the active server 11 finds out that NAS Head Two stores FCCT-N in which file cache information of the objective file is written (that NAS Head Two is connected to the disk drive 25 where the objective file is stored) (4), and judges whether or not NAS Head Two is in possession of a cache of the objective file. When NAS Head Two owns a cache of the objective file, the file is read out of the file cache 222 (Case 25).

When NAS Head Two is not in possession of a cache of the objective file, the server 11 refers the FCCT-N to find out which of other NAS heads than NAS Head Two has a cache of the objective file. Finding out that NAS Head One has a cache of the objective file, the server 11 accesses NAS Head One (5), and reads the file out of the file cache 212 (Case 26).

In the case where none of the NAS heads has a cache of the objective file, the server 11 accesses the disk 25 via NAS Head Two, and reads the file out of the disk 25 (Case 27).

Thus, an active server stores in the active global cache a file it has read out. A file read out by an active server is not stored in the standby global cache (whereas a file written by an active server is stored in the standby global cache as will be described later).

Figure 17:
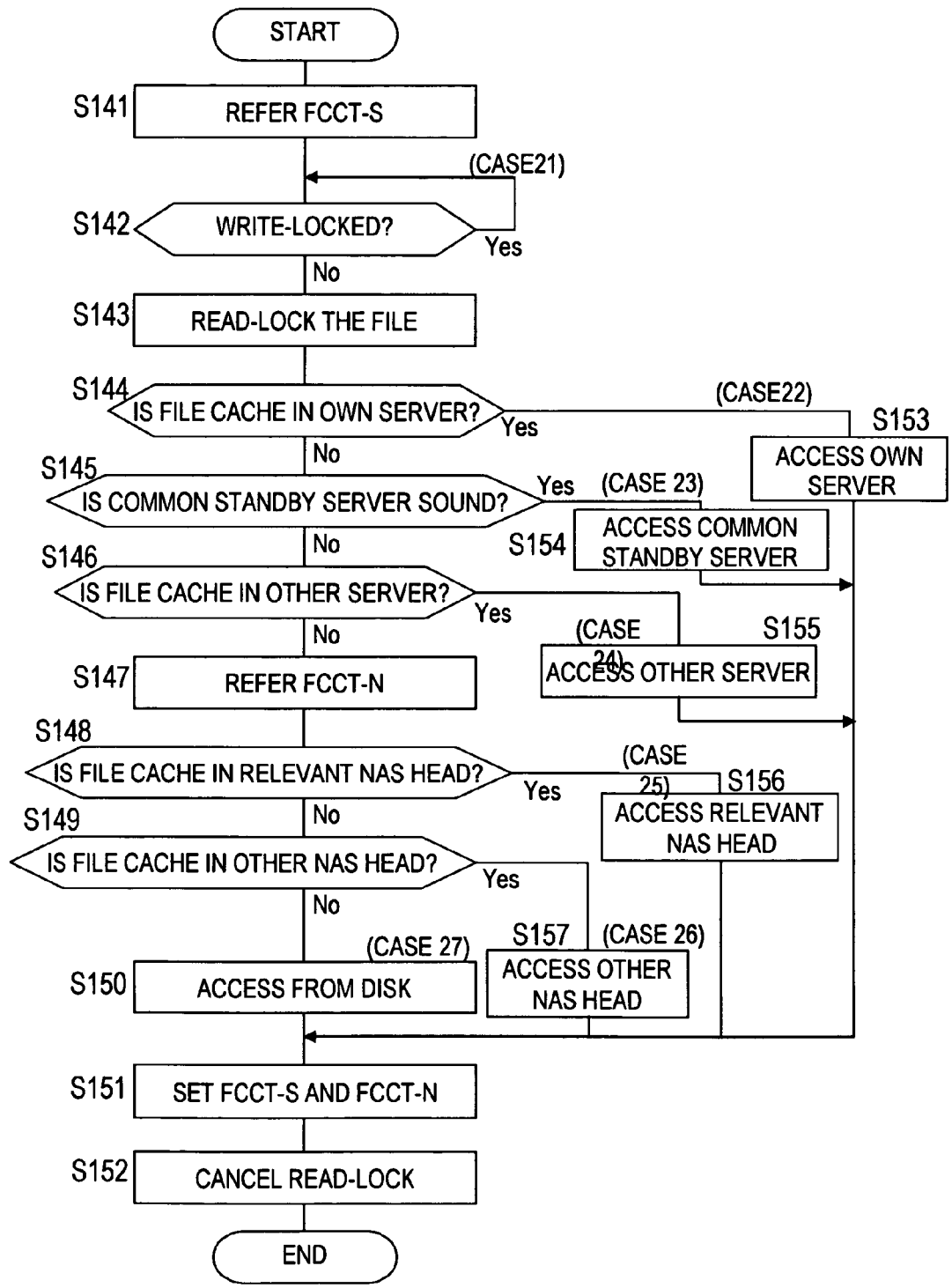
FIG. 17 is a flow chart of read processing according to the second embodiment of this invention.

FIG. 17 is a flow chart of read processing according to the second embodiment.

Processing of steps S141 to S144 is the same as the processing of the steps S101 to S114 described in the first embodiment. A detailed description on these steps will therefore be omitted.

An OS 113 of the active server 11 first refers the in possession/not in possession 1114 in the FCCT-S (S141). To elaborate, upon reception of a file read request from application programs 115 and 116 of the active server 11, the OS 113 refers the lock state 1113 in the FCCT-S to judge whether or not the file for which the read request is made is in a write lock state (S142).

When the OS 113 finds as a result that the file for which the read request is made is in a write lock state, it is judged as Case 21, in which the OS 113 waits until the write lock is lifted. On the other hand, when the file for which the read request is made is not in a write lock state, the requested file is set to a read lock state (S143).

Next, the OS 113 judges whether the file for which the read request is made is in the file cache of its own server or not (S144). When the OS 113 finds as a result that the requested file is in the file cache of its own server, it is judged as Case 22, in which the OS 113 reads the file out of the file cache of its own server (S153).

On the other hand, when the OS 113 finds in the step S144 that the file for which the read request is made is not in the file cache of its own server, the processing moves to a step S145.

In the step S145, the OS 113 judges whether the common standby server 15 is operating normally or not. For instance, when the common standby server 15 is in a degenerate mode as will be described later with reference to a step S503 of FIG. 20, the common standby server 15 is not in operation.

When the common standby server 15 is found to be in operation, it is judged as Case 23. In Case 23, the OS 113 accesses the common standby server 15 and reads the requested file out of the file cache 152 of the common standby server 15 where a cache of every file written by the active servers 11 to 13 is stored (S154). The processing then moves to a step S151.

On the other hand, when it is found in the step S145 that the common standby server 15 is not operating normally, the processing moves to a step S146.

Processing of steps S146 to S152 is the same as the processing of the steps S105 to S111 described in the first embodiment. A detailed description on these steps will therefore be omitted.

In the step S146, the OS 113 judges whether or not other servers store the requested file in their file caches. When the OS 113 finds as a result that one of other servers stores the requested file in its file cache, it is judged as Case 24. In Case 24, the OS 113 accesses this other server and reads the requested file out of the file cache of this other server (S155).

On the other hand, when the OS 113 finds as a result that none of other active servers stores the file for which the read request is made in its file cache, the processing moves to a step S147. In short, it is judged that none of the active servers 11 to 13 and the common standby server 15 stores in its file cache the file for which the read request is made.

In the step S147, the OS 113 refers the in possession/not in possession 2114 of FCCT-N contained in the NAS heads. The OS 113 then judges whether or not the file for which the read request is made is stored in the file cache of the NAS head that is connected to a disk drive where the requested file is stored (S148).

When the OS 113 finds as a result that this NAS head stores the requested file in its file cache, it is judged as Case 25. In Case 25, the OS 113 reads the requested file out of the file cache of this NAS head (S156).

Next, the OS 113 judges whether other NAS heads store the requested file in their file caches or not (S149). When one of other NAS heads stores the requested file in its file cache, it is judged as Case 26, in which the OS 113 reads the requested file out of the file cache of this other NAS head (S157).

On the other hand, when the OS 113 finds in the step S149 that none of other NAS heads stores the file for which the read request is made in its file cache, it is judged that none of the servers and NAS heads stores in its file cache the file for which the read request is made (Case 27). In Case 27, the OS 113 reads, out of a disk drive, the file for which the read request is made (S150).

Thereafter, the OS 113 raises the read count in the FCCT-S and the read count in the FCCT-N (S151).

Thereafter, the read lock is lifted (S152).

Figure 18:
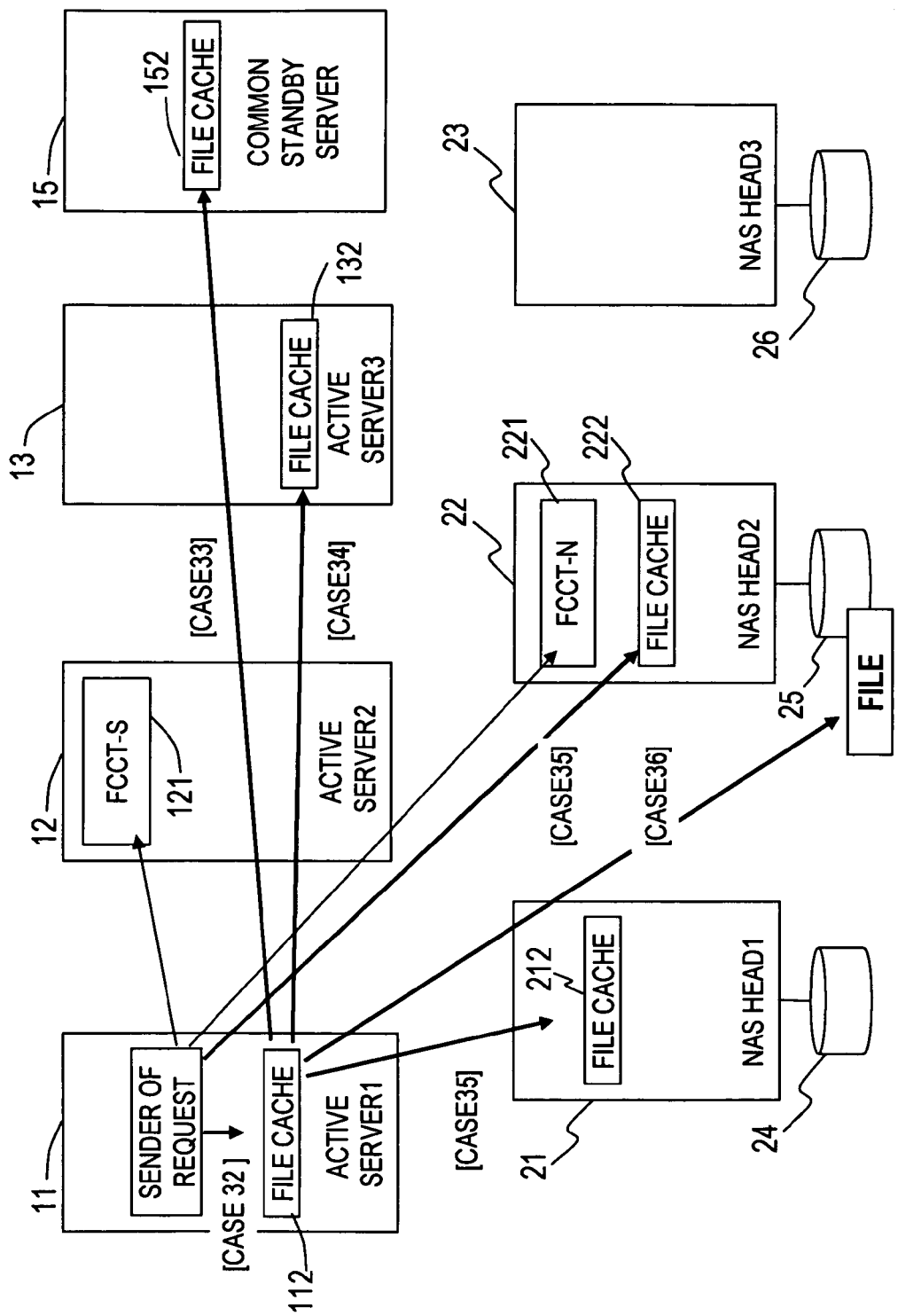
FIG. 18 is a diagram showing a write processing access order in the second embodiment of this invention.

FIG. 18 is a diagram showing a write processing access order in the respective cases according to the second embodiment.

FIG. 18 illustrates a case in which the active server 11 is the sender of a file read request and the objective file is stored in a disk drive 25, which is connected to NAS Head Two.

First, the active server 11 (=Server One), which is the sender of the request, writes in the file cache of the own server the file requested to be written unless the file is in a locked state (Case 32).

The active server 11 then transfers the file requested to be written to the common standby server 15, and stores the file in the cache memory 152 (Case 33).

When the objective file is met a condition the objective file to be stored in the file cache of other servers, the active server 11 transfers the objective file to the other servers that meet a condition and stores the file in their cache memories (Case 34).

When the objective file is met a condition the objective file to be stored in the file cache of other NAS heads, the active server 11 transfers the objective file to the NAS heads that meet a condition and stores the file in their cache memories (Case 35).

A file stored in the cache memory of the active server 11 is transferred to a NAS head that is connected to a disk drive where the file is to be stored, and the file is written in the disk drive (Case 36).

In the second embodiment of this invention, a standby global cache is constructed by transferring a file stored in a cache to a common standby server, and a file stored in a cache is transferred from one server to another to make caches redundant among servers. Similarly, a file stored in a cache is transferred to NAS heads to make caches redundant between NAS heads.

Figure 19:
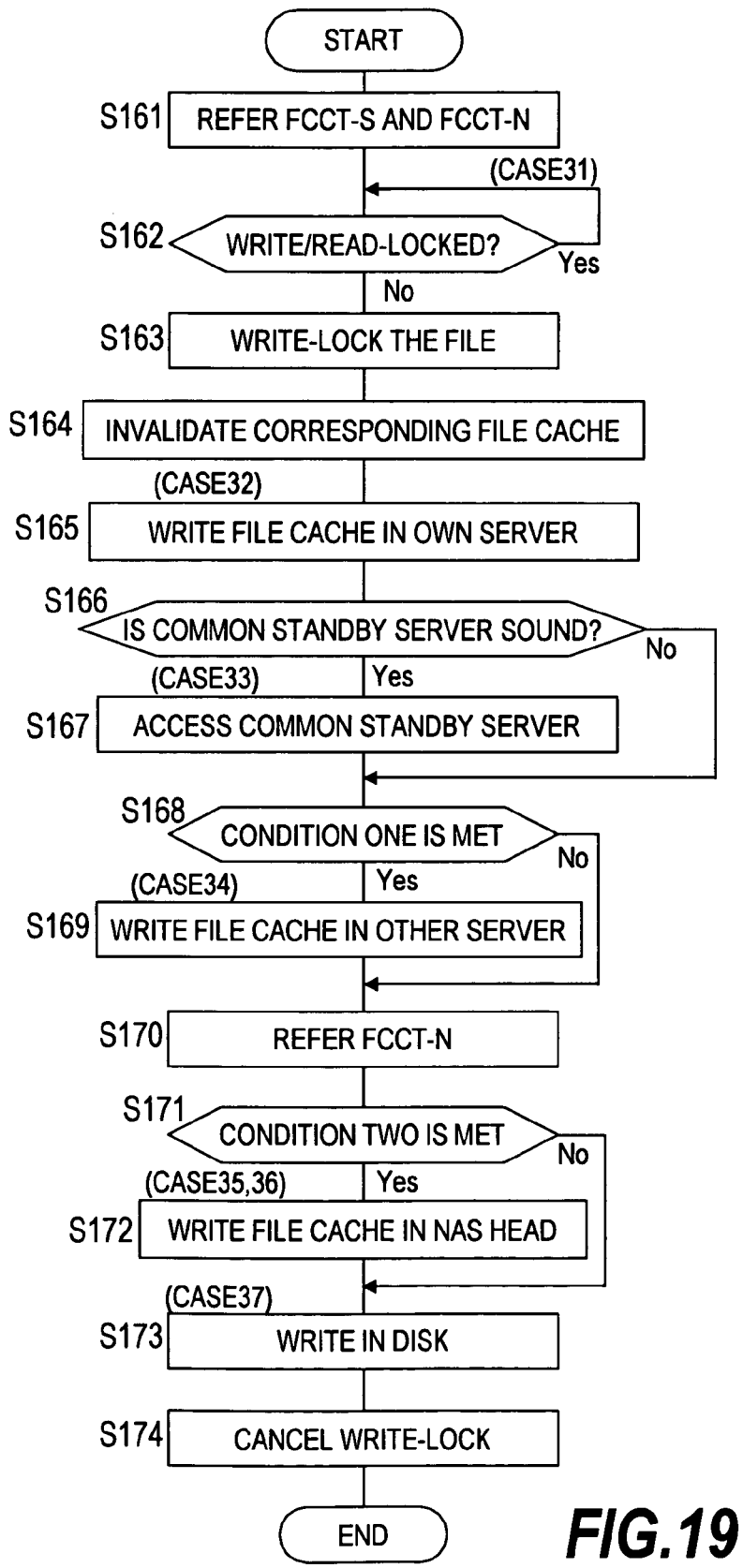
FIG. 19 is a flow chart showing how case-by-case write processing is performed according to the second embodiment of this invention.

FIG. 19 is a flow chart of write processing according to the second embodiment.

Processing of steps S161 to S165 is the same as the processing of the steps S121 to S125 described in the first embodiment. A detailed description on these steps will therefore be omitted.

Upon reception of a file write request from the application programs 115 and 116, the OS 113 first refers the in possession/not in possession 1114 of the FCCT-S and the in possession/not in possession 2114 of the FCCT-N (S161).

Next, the OS 113 refers the lock state 1113 in the FCCT-S to judge whether or not the file for which the write request is made is in a write lock state and whether or not the file is in a read lock state (S162).

When the OS 113 finds as a result that the file for which the write request is made is in a write lock state or in a read lock state, it is judged as Case 31, in which the OS 113 waits until the access lock is lifted. On the other hand, when it is found in the step S162 that the file for which the write request is made is neither in a write lock state nor in a read lock state, and the requested file is set to a write lock state (S163).

Next, the OS 113 invalidates the file caches of servers and NAS heads that are found as a result of the search conducted in the step S161 with the use of the data of the in possession/not in possession 1114 in the FCCT-S and of the in possession/not in possession 2114 in the FCCT-N (S164).

The OS 113 then writes in the file cache of its own server the file for which the write request is made (S165). This writing processing corresponds to Case 32. The processing then moves to a step S166.

In the step S166, the OS 113 judges whether the common standby server 15 is operating normally or not. For instance, when the common standby server 15 is in a degenerate mode as will be described later with reference to the step S503 of FIG. 20, the common standby server 15 is not in operation.

When the common standby server 15 is found to be in operation, it is judged as Case 33. In Case 33, the OS 113 accesses the common standby server 15 and writes the requested file in the file cache 152 of the common standby server 15 where a cache of every file written by the active servers 11 to 13 is stored (S167). The processing then moves to a step S168.

On the other hand, when it is found in the step S168 that the common standby server 15 is not operating normally, the processing moves to a step S168. In short, it is judged that none of the servers stores in its file cache the file for which the write request is made.

Processing of steps S168 to S174 is the same as the processing of the steps S126 to S132 described in the first embodiment. A detailed description on these steps will therefore be omitted.

In a step S168, the OS 113 judges for each server whether every item in Condition One is met or not. The OS 113 writes the requested file in the cache memories of other servers that meet every item in Condition One (S169).

Then the OS 113 refers the access counts 2115 and 2116 in the FCCT-N (S170). The OS 113 next judges for each NAS head whether every item in Condition Two is met or not (S171). The OS 113 writes the requested file in the cache memories of NAS heads that meet every item in Condition Two (S172).

The requested file is then written in the disk drive (S173), and the write lock is lifted (S174).

Described next is a procedure of server failure processing.

Figure 20:
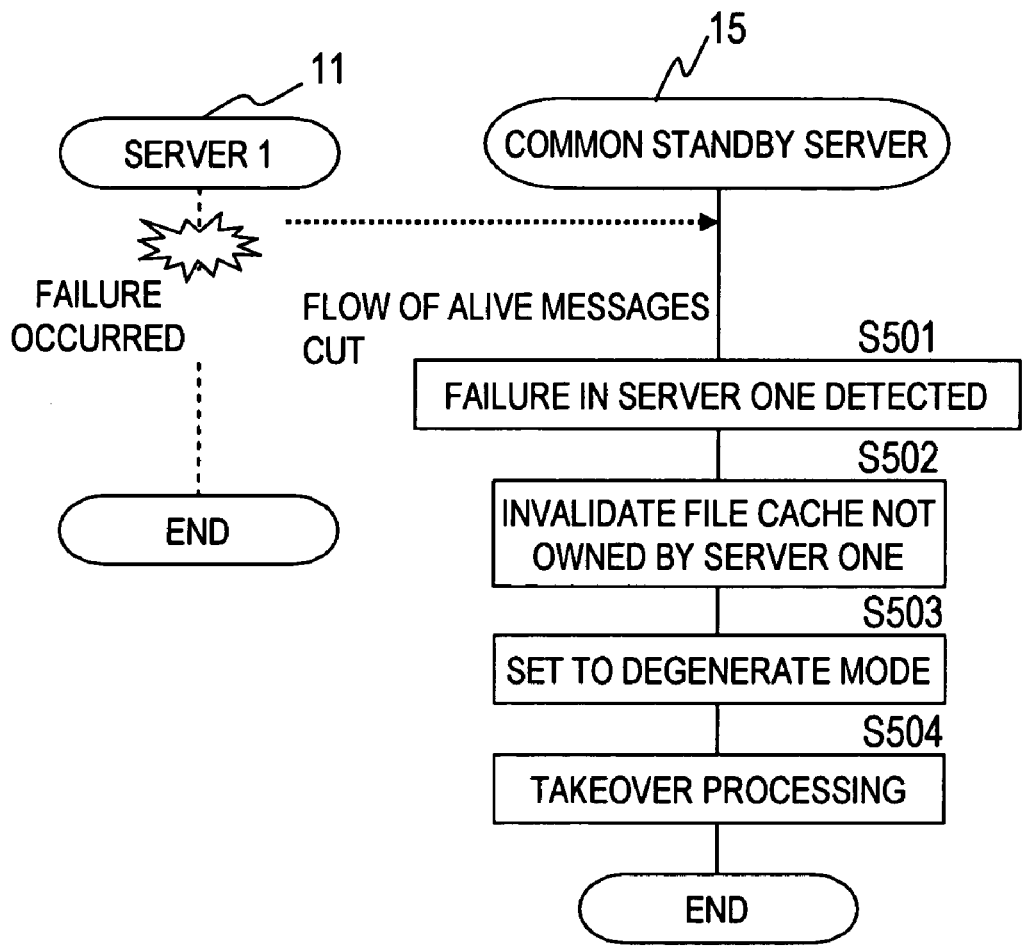
FIG. 20 is a sequence diagram of a server failure processing procedure according to the second embodiment of this invention.

FIG. 20 is a sequence diagram of a server failure processing procedure according to the second embodiment.

Each of the active servers 11 to 13 sends out an alive message at given timing (e.g., in two-second cycles). The common standby server 15 knows, by receiving alive messages from the active servers 11 to 13, that the server that has sent the alive message is in operation. Also, by receiving no alive messages for longer than a given period of time, the common standby server 15 knows that there has been a server failure.

When a failure occurs in Server One, alive messages are no longer sent from Server One. The common standby server 15 detects that a failure has occurred in Server One by the flow of alive messages from Server One being cut off (S501).

Then the common standby server 15 invalidates file caches that are not in possession of Server One. In the example shown in FIG. 15, FC3 and FC4 are invalidated (S502).

The common standby server 15 is then set to a degenerate mode (S503). When in the degenerate mode, the common standby server 15 executes a service of another active server, and no serve stand by as a common standby server.

As a takeover server, the common standby server 15 uses cluster software to activate application programs that have been run on Server One, and starts providing a service that has been provided by Server One (S504).

As has been described, a computer system according to the second embodiment of this invention has plural active servers and one or more standby servers, which constitute a standby global cache. The standby global cache can be put into use when a failure occurs, thereby shortening the switching time upon failure and improving the usability.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising plural servers each having a disk drive and plural storage systems with each storage system having a disk drive for storing files read/written by the servers and a storage control device, which has an interface connected to the servers via a network and a controller for controlling file read/write in the disk drive of the storage system, wherein the storage control device comprises a second cache memory, which temporarily stores files read/written by the storage control device, and a second file cache control information module, which stores second file cache information which is information on files stored in the second cache memories;

wherein the servers each include a first cache memory, which temporarily stores files read/written by the servers, and a first file cache control information module, which stores first file cache information which is information on files stored in the first cache memories;

wherein each of the first and the second file cache information stored in each of the first and the second file cache control information modules includes: whether or not a file is stored in one of the first and the second cache memories; a size of a file stored in the one of the first and the second cache memories; a number of times the file stored in the one of the first and the second cache memories is read; and a number of times the file stored in the one of the first and the second cache memories is written; and wherein the plural servers transfer the first file cache information between each other, the plural storage systems transfer the second file cache information between each other, and the plural servers and the plural storage systems transfer the first and the second file cache information between each other.

2. The computer system according to claim 1, wherein file information stored in at least one of the first and second file cache control information modules includes a size of a file stored in the cache memory, a number of times the file stored in the cache memory is read, and a number of times the file stored in the cache memory, is written.

3. The computer system according to claim 2, wherein, when writing a file in the disk drive of any server, one of the servers uses file information stored in the file cache control information module of a server to determine which server has this file stored in its cache memory, and transfers this file to the server determined.

4. The computer system according to claim 3, wherein the one of the servers does not transfer the file when at least one of the following conditions is met: the size of the file, which is stored in the file cache control information module of the server is, larger than a predetermined value; a number of writes to the file, which is stored in the cache control information module of the server, is smaller than a predetermined value; and a number of reads of the file, which is stored in the cache control information module of the server, is smaller than a predetermined value.

5. The computer system according to claim 1, wherein the file cache control information module of a server stores, for each file, file information that is divided among the plural servers to be stored in the cache memory, and wherein one of the servers deletes, upon detecting a failure in another of the servers, from the cache memory, a file related to file information stored in the server where the failure has occurred.

6. The computer system according to claim 2, wherein, when writing a file in the disk drive of any storage system, one of the servers determines, based on file information stored in its file cache control information module, which storage control device has this file stored in its cache memory, and transfers this file to the storage control device determined.

7. The computer system according to claim 6, wherein the one of the servers does not transfer the file when at least one of the following conditions is met: a size of the file, which is stored in the file cache control information module of a server, is larger than a predetermined value; a number of writes to the file, which is stored in the cache control information module of the server, is smaller than a predetermined value; and a number of reads of the file, which is stored in the cache control information module of the server, is smaller than a predetermined value.

8. The computer system according to claim 1, wherein the plural servers include plural active servers and at least one standby server, wherein, when writing a file in the disk drive of any storage system, the active servers transfer the file to the at least one standby server, wherein the at least one standby server stores the transferred file in it's cache memory, and wherein the at least one standby server executes, upon detecting a failure in one of the active servers, an operation that has been executed by the active server where the failure has occurred.

9. The computer system according to claim 8, wherein, upon detecting a failure in one of the active servers, the at least one standby server deletes from it's cache memory a file that is not stored in the active server where the failure has occurred, and then executes an operation that has been executed by the active server where the failure has occurred.

10. The computer system according to claim 1, wherein the servers, upon reception of a read request, refer to the first file cache information to: identify which server stores the file for which the read request is made, and reads the file from the identified server; and identify, in a case where the file does not exist in any of the servers, whether or not one of the storage devices stores the file for which the read request is made, and reads the file from the identified storage device.

* * * * *